US012441305B2

(12) United States Patent
Mita

(10) Patent No.: US 12,441,305 B2
(45) Date of Patent: Oct. 14, 2025

(54) VEHICLE CONTROL DEVICE

(71) Applicant: Hitachi Astemo, Ltd., Hitachinaka (JP)

(72) Inventor: Ryota Mita, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 171 days.

(21) Appl. No.: 18/249,090

(22) PCT Filed: Sep. 27, 2021

(86) PCT No.: PCT/JP2021/035457
§ 371 (c)(1),
(2) Date: Apr. 14, 2023

(87) PCT Pub. No.: WO2022/097387
PCT Pub. Date: May 12, 2022

(65) Prior Publication Data
US 2023/0391320 A1 Dec. 7, 2023

(30) Foreign Application Priority Data

Nov. 5, 2020 (JP) ................. 2020-185024

(51) Int. Cl.
*B60W 30/09* (2012.01)
*B60W 60/00* (2020.01)

(52) U.S. Cl.
CPC ........... *B60W 30/09* (2013.01); *B60W 60/001* (2020.02); *B60W 2420/403* (2013.01); *B60W 2420/408* (2024.01); *B60W 2554/80* (2020.02)

(58) Field of Classification Search
CPC ..... B60W 2420/403; B60W 2420/408; B60W 60/001; B60W 2554/80; B60W 30/08; B60W 30/085

(Continued)

(56) References Cited

U.S. PATENT DOCUMENTS

2004/0254729 A1* 12/2004 Browne ................ G01S 13/931
701/45
2006/0031015 A1* 2/2006 Paradie .................... G06T 7/70
340/436

(Continued)

FOREIGN PATENT DOCUMENTS

JP 2008-024108 A 2/2008
JP 2009-053059 A 3/2009

(Continued)

OTHER PUBLICATIONS

Machine translation of JP 2008024108 A. (Actual Japanese document provided in the IDS) (Year: 2008).*

(Continued)

Primary Examiner — Kenneth M Dunne
(74) Attorney, Agent, or Firm — Foley & Lardner LLP

(57) ABSTRACT

A vehicle control device mounted on a vehicle includes one or more processors to detect an object around the vehicle based on external environment information and generate three-dimensional object information and information on a plurality of split regions, and set a damage degree to each of the plurality of split regions depending on an estimated magnitude of damage at an estimated time of collision of the vehicle. The one or more processors record information on a plurality of host vehicle split regions, and a host vehicle damage degree set to each of the plurality of host vehicle split regions depending on an estimated magnitude of damage at an estimated time of collision of the object and control travel of the vehicle to minimize a collision damage degree corresponding to the damage degree and a product of the damage degree and the host vehicle damage degree.

6 Claims, 15 Drawing Sheets

(58) Field of Classification Search
USPC .......................................................... 701/301
See application file for complete search history.

(56) References Cited

U.S. PATENT DOCUMENTS

| | | | | |
|---|---|---|---|---|
| 2011/0301845 A1* | 12/2011 | Harada | ................. | G08G 1/166 |
| | | | | 701/301 |
| 2018/0281786 A1* | 10/2018 | Oyaizu | .............. | B62D 15/0265 |
| 2018/0299884 A1 | 10/2018 | Morita | | |
| 2019/0344784 A1* | 11/2019 | You | ....................... | B60W 10/20 |

FOREIGN PATENT DOCUMENTS

| | | |
|---|---|---|
| JP | 2012-232693 A | 11/2012 |
| JP | 2016-002898 A | 1/2016 |
| JP | 2019-026056 A | 2/2019 |
| WO | WO-2017/056374 A1 | 4/2017 |
| WO | WO-2017/111139 A1 | 6/2017 |

OTHER PUBLICATIONS

International Search Report with English Translation and Written Opinion of International Patent Application No. PCT/JP2021/035457 dated Dec. 14, 2021 (9 pages).

* cited by examiner

| | PRECEDING VEHICLE LV | HOST VEHICLE V | COEFFICIENT | COLLISION DAMAGE DEGREE |
|---|---|---|---|---|
| UPPER PORTION | 2 | 5 | 3 | 30 |
| LOWER PORTION | 4 | 4 | 3 | 48 |
| OVERALL | — | — | — | 78 |

| | PRECEDING VEHICLE LV | HOST VEHICLE V | COEFFICIENT | COLLISION DAMAGE DEGREE |
|---|---|---|---|---|
| UPPER PORTION | 1 | 4 (ONLY LOWER PORTION) | 3 | 12 |
| LOWER PORTION | 2 | | 3 | 24 |
| OVERALL | — | — | — | 36 |

| | HOST VEHICLE V | PEDESTRIAN P | COEFFICIENT | COLLISION DAMAGE DEGREE |
|---|---|---|---|---|
| UPPER PORTION | 1 | 10 | 3 | 30 |
| LOWER PORTION | 3 | 10 | 3 | 90 |
| OVERALL | — | — | — | 120 |

VEHICLE CONTROL DEVICE

TECHNICAL FIELD

The present invention relates to a vehicle control device.

BACKGROUND ART

Conventionally, there is known an invention that relates to a vehicle control device controlling a host vehicle which is a vehicle equipped with the own device (PTL 1 below). The vehicle control device described in PTL 1 includes an obstacle detection unit, an avoidance possibility determination unit, a collision range specifying unit, a minimum damage site specifying unit, and a progress control unit (Abstract, paragraph 0006, claim 1, and the like in PTL 1).

The obstacle detection unit detects an obstacle that is likely to collide with the host vehicle. When the obstacle detection unit detects an obstacle, the avoidance possibility determination unit determines whether or not a collision with the obstacle is avoidable by controlling progress of the host vehicle. When the avoidance possibility determination unit determines that the collision with the obstacle is not avoidable, the collision range specifying unit specifies a range in which the obstacle may collide with the host vehicle.

The minimum damage site specifying unit specifies a site where damage to the obstacle is minimum when the host vehicle collides out of the range specified by the collision range specifying unit. When the avoidance possibility determination unit determines that the collision with the obstacle is not avoidable, the progress control unit controls the progress of the host vehicle such that the site specified by the minimum damage portion specifying unit is deformed.

According to this conventional vehicle control device, when it is determined that collision with an obstacle is not avoidable, the progress of the host vehicle is controlled such that the site where the damage to the obstacle caused by the collision is minimized is deformed. As a result, the conventional vehicle control device can minimize the damage to the obstacle when the collision with the obstacle is not avoidable (paragraph 0013 and the like in PTL 1).

Furthermore, the conventional vehicle control device includes a risk storage unit that stores, for each type of obstacle, risk information indicating a relationship between a site of the obstacle and a magnitude of damage caused when the obstacle and the host vehicle collide with each other. Further, the obstacle detection unit specifies a type of the obstacle. Furthermore, the minimum damage site specifying unit reads risk information associated with the type specified by the obstacle detection unit, and specifies a site having the minimum magnitude of damage indicated by the risk information in the range specified by the collision range specifying unit (paragraph 0007 and claim 2 in PTL 1).

With such a configuration, it is possible to specify the site where the damage to the obstacle caused by the collision is minimized using the type of the obstacle. As a result, the conventional vehicle control device can perform optimal control for each obstacle (paragraph 0014 in PTL 1). Note that the risk information is information indicating a relationship between a site of an obstacle and a risk value which is a magnitude of damage that occurs when the obstacle and the host vehicle collide with each other (paragraph 0021 and FIG. 2 in PTL 1).

CITATION LIST

Patent Literature

PTL 1: JP 2012-232693 A

SUMMARY OF INVENTION

Technical Problem

In the above-described conventional vehicle control device, the obstacle detection unit detects an obstacle by a laser radar, a camera, or the like, and estimates a type of the obstacle such as a sedan, a truck, or a bus based on a lateral width and a moving speed of the detected obstacle (paragraph 0020 in PTL 1). However, when the obstacle is detected from the front or obliquely front side by the laser radar, the camera, or the like, there is a possibility that it is difficult to accurately estimate the type of the obstacle only by the lateral width and the moving speed of the obstacle.

The present disclosure provides a vehicle control device capable of more reliably avoiding a collision between an obstacle and a vehicle or reducing a collision damage by more accurately estimating a type and a risk of the obstacle than a conventional vehicle control device.

Solution to Problem

One aspect of the present disclosure is a vehicle control device mounted on a vehicle, the vehicle control device including: a three-dimensional object information generation unit that detects an object around the vehicle based on external environment information output from an external sensor mounted on the vehicle to generate three-dimensional object information; a damage degree map generation unit that generates information on a plurality of split regions, which are obtained by splitting a target region including the object in a longitudinal direction and a height direction based on the external environment information, and sets a damage degree to each of the plurality of split regions depending on a magnitude of damage at a time of collision of the vehicle; and a travel control unit that controls travel of the vehicle to minimize a collision damage degree corresponding to the damage degree.

Advantageous Effects of Invention

According to the above aspect of the present disclosure, it is possible to provide the vehicle control device capable of more reliably avoiding the collision between the obstacle and the vehicle or reducing the collision damage by more accurately estimating the type and the risk of the obstacle than the conventional vehicle control device.

DESCRIPTION OF EMBODIMENTS

Hereinafter, embodiments of a vehicle control device according to the present disclosure will be described with reference to the drawings.

First Embodiment

Figure 1:
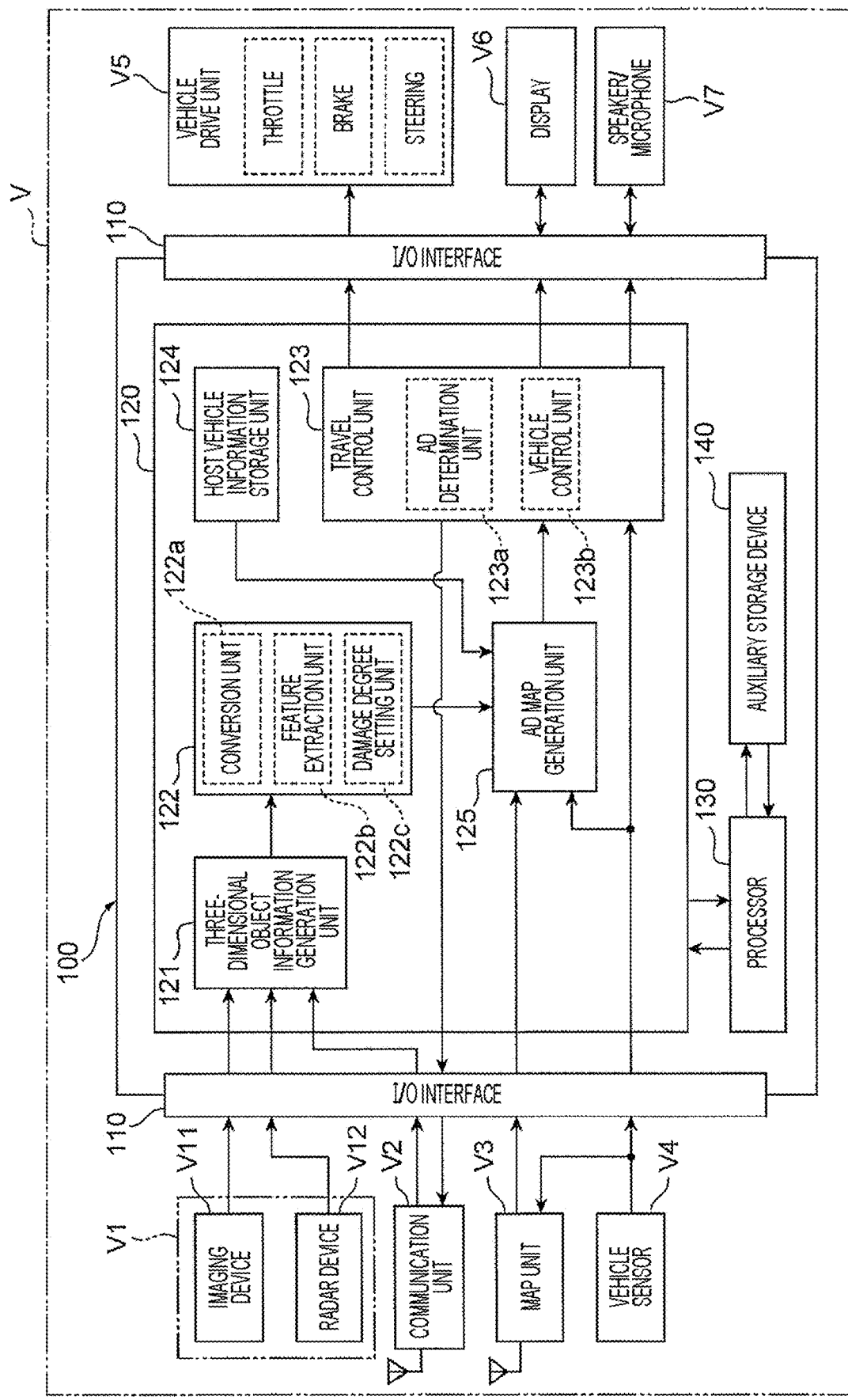
FIG. 1 is a block diagram illustrating a first embodiment of a vehicle control device according to the present disclosure.

FIG. 1 is a block diagram illustrating a first embodiment of a vehicle control device according to the present disclosure. A vehicle control device 100 of the present embodiment is an electronic control unit (ECU) that is mounted on a vehicle V such as a gasoline vehicle, a hybrid vehicle, or an electric vehicle and controls travel of the vehicle V. The vehicle control device 100 is, for example, an automated driving ECU that causes the vehicle V to autonomously travel, and includes an input/output interface 110, a memory 120, a processor 130, and a nonvolatile auxiliary storage device 140.

The vehicle control device 100 includes, for example, a three-dimensional object information generation unit 121, a damage degree map generation unit 122, and a travel control unit 123. Further, the vehicle control device 100 in the present embodiment further includes, for example, a host vehicle information storage unit 124 and an AD map generation unit 125. Further, the damage degree map generation unit 122 includes a conversion unit 122a, a feature extraction unit 122b, and a damage degree setting unit 122c in the example illustrated in FIG. 1.

The respective units of the vehicle control device 100 described above are functional blocks of the vehicle control device 100 implemented, for example, as the processor 130 loads a program or a table stored in the auxiliary storage device 140 into the memory 120 and executes the program or the table.

The vehicle V (hereinafter, referred to as "host vehicle V") on which the vehicle control device 100 is mounted includes, for example, an external sensor V1, a communication unit V2, a map unit V3, a vehicle sensor V4, a vehicle drive unit V5, a display V6, and a speaker V7. The respective units of the host vehicle V and the input/output interface 110 of the vehicle control device 100 are connected via, for example, a local area network (LAN) or a controller area network (CAN).

The external sensor V1 acquires external environment information around the host vehicle V. The external sensor V1 includes, for example, an imaging device V11. The imaging device V11 includes, for example, a monocular camera or a stereo camera, and outputs at least an image of a three-dimensional object in front of the host vehicle V to the vehicle control device 100 as the external environment information. Further, the external sensor V1 includes, for example, a radar device V12. The radar device V12 includes, for example, a millimeter wave radar device or a laser radar device. The laser radar device outputs at least information on the three-dimensional object in front of the host vehicle V to the vehicle control device 100 as the external environment information. The millimeter wave radar device outputs, for example, at least a distance and a direction of the three-dimensional object in front of host vehicle V and a reflection intensity of a millimeter wave to the vehicle control device 100 as the external environment information.

The communication unit V2 is, for example, a wireless communication device that performs wireless communication with the outside of the host vehicle V. More specifically, the communication unit V2 performs, for example, vehicle-to-vehicle communication between the host vehicle V and another vehicle, road-to-vehicle communication between the host vehicle V and infrastructure equipment such as communication equipment on a road side, wireless communication between the host vehicle V and a base station, and the like. The communication unit V2 outputs information received from the outside of the host vehicle V to the vehicle control device 100, and transmits information input from the vehicle control device 100 to the outside of the host vehicle V.

For example, the communication unit V2 receives a position, a speed, and vehicle control information of another vehicle from the communication unit V2 of another vehicle, and outputs the information to the vehicle control device 100. Further, the communication unit V2 receives, for example, traffic light information, traffic regulation information, road information, and the like from the infrastructure equipment, and outputs the received information to the vehicle control device 100. Further, the communication unit V2 transmits, for example, the position, speed, and vehicle control information of the host vehicle V output from the vehicle control device 100 to another vehicle or infrastructure equipment on the outside.

The map unit V3 includes, for example, an antenna that receives a radio wave from a positioning satellite of a global positioning satellite system (GNSS), and a locator that calculates position information of the host vehicle V based on the received radio wave. Further, the map unit V3 includes a storage device and a map database stored in the storage device. The map unit V3 outputs map information including the position information of the host vehicle V calculated by the locator and road information around the host vehicle V acquired from the map database to the vehicle control device 100. The map information includes, for example, detailed information such as a road, a sign, and a natural feature necessary for automated driving of host vehicle V.

The vehicle sensor V4 includes various sensors that acquire various types of information on the host vehicle V, such as an engine sensor, a steering angle sensor, a steering torque sensor, a brake sensor, an accelerator sensor, a speed sensor, and an acceleration sensor. The vehicle sensor V4 outputs, for example, the acquired various types of information on the host vehicle V to the map unit V3 and the vehicle control device 100.

The vehicle drive unit V5 includes, for example, a plurality of actuators that automatically operate the respective units of the host vehicle V, such as a throttle, a brake, a steering, and a transmission, based on a control signal input from the vehicle control device 100. The vehicle drive unit V5 automatically operates the respective units of the host vehicle V based on, for example, the control signal input from the vehicle control device 100, thereby enabling automated driving and driving assistance of the host vehicle V.

The display V6 includes, for example, a liquid crystal display device or an organic EL display device. The display V6 displays, for example, the various types of information on the host vehicle V acquired by the vehicle sensor V4, a driving state of the host vehicle V based on these pieces of information, and a communication content, guidance, a warning, and the like received via the communication unit V2 based on an image signal input from the vehicle control device 100. The display V6 includes, for example, a touch panel, and also functions as an input device to which a driver of the host vehicle V inputs information.

The speaker V7 issues voice guidance, an attention, a warning sound, or the like based on the control signal input from the vehicle control device 100, for example. Further, the speaker V7 may have a function as, for example, a microphone that receives an input of the driver's voice and outputs a voice signal to the vehicle control device 100. Further, the speaker V7 and the microphone may be provided separately.

Figure 2:
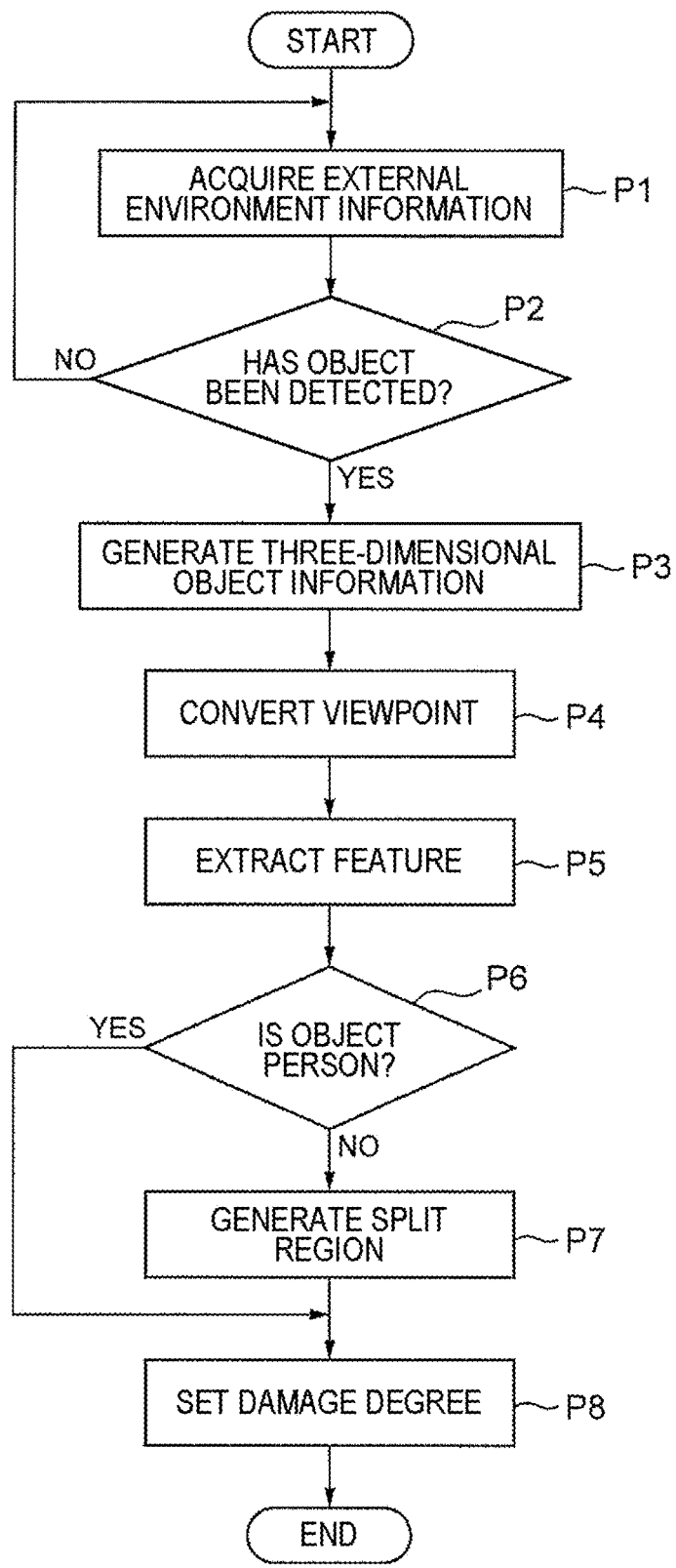
FIG. 2 is a flowchart illustrating an example of a flow of processing of the vehicle control device of FIG. 1.

Hereinafter, the vehicle control device 100 illustrated in FIG. 1 will be described in detail with reference to FIGS. 2 to 13. FIG. 2 is a flowchart illustrating an example of a flow of processing of the vehicle control device 100 of FIG. 1.

For example, when the automated driving or driving assistance of the host vehicle V is started, the vehicle control device 100 starts the processing illustrated in FIG. 2 and executes a process P1 of acquiring external environment information. In this process P1, the vehicle control device 100 acquires the external environment information from the external sensor V1 via the input/output interface 110. More specifically, the vehicle control device 100 acquires, for example, an image in front of the host vehicle V from the imaging device V11 as the external environment information.

Further, the vehicle control device 100 acquires, for example, a distance and a direction of an object in front of the host vehicle V and an intensity of a reflected wave from the radar device V12 as the external environment information in the process P1 of acquiring the external environment information. Further, the vehicle control device 100 may acquire, for example, information on an object around the host vehicle V from another vehicle outside the host vehicle V or the infrastructure equipment on the road side via the communication unit V2 in this process P1.

Next, the vehicle control device 100 executes a process P2 of determining whether or not an object has been detected. In this process P2, for example, the vehicle control device 100 processes the external environment information, output from the external sensor V1 mounted on the host vehicle V and input via the input/output interface 110, using the three-dimensional object information generation unit 121, and determines whether or not an object in front of or around the host vehicle V has been detected.

Further, when the vehicle control device 100 acquires the information on the object around the host vehicle V from the outside via the communication unit V2 in the above-described process P1, the information on the object acquired from the outside may be used in the process P2. In this case, the three-dimensional object information generation unit 121 processes the information on the object acquired from the outside and the external environment information acquired from the external sensor V1, and determines whether or not an object in front of or around the host vehicle V has been detected.

The three-dimensional object information generation unit 121 returns to the process P1 of acquiring external environment information when determining that no object has been detected (NO) in the process P2, and executes a process P3 of generating next three-dimensional object information when determining that an object has been detected (YES).

In the process P3 of generating three-dimensional object information, for example, the vehicle control device 100 processes at least one of the external environment information acquired from the external sensor V1 in the process P1 and the information on the object acquired from the outside of the host vehicle V using the three-dimensional object information generation unit 121 to generate the three-dimensional object information. Here, the three-dimensional object information is generated for each object detected in the previous process P2, and includes, for example, information unique to each object such as a size, a shape, a position, a speed, an acceleration, a posture (orientation), an image, and a reflection intensity of a millimeter wave radar of the object.

Next, the vehicle control device 100 executes a viewpoint conversion process P4, for example. In this process P4, the vehicle control device 100 performs, for example, viewpoint conversion of the three-dimensional object information using the conversion unit 122a. More specifically, for example, the conversion unit 122a converts information on a front surface of the object included in the three-dimensional object information based on the external environment information, acquired from an oblique direction intersecting a longitudinal direction of the object by the external sensor V1, into perpendicularly facing front surface information obtained by perpendicularly facing the front surface. Further, the conversion unit 122a converts, for example, information on a side surface of the object included in the three-dimensional object information into perpendicularly facing side surface information obtained by perpendicularly facing the side surface.

Figure 3:
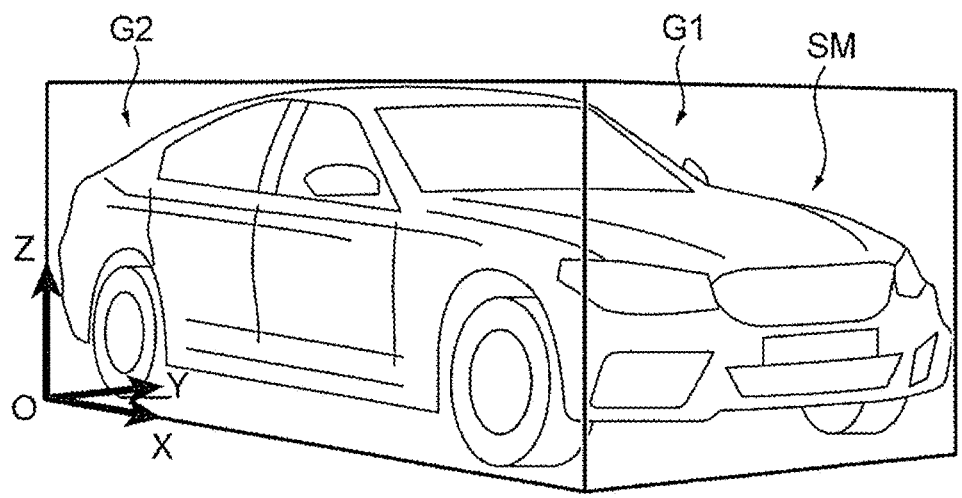
FIG. 3 is a conceptual view illustrating an example of a viewpoint conversion process in FIG. 2.
Figure 3:
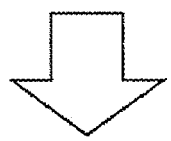
Figure 3:
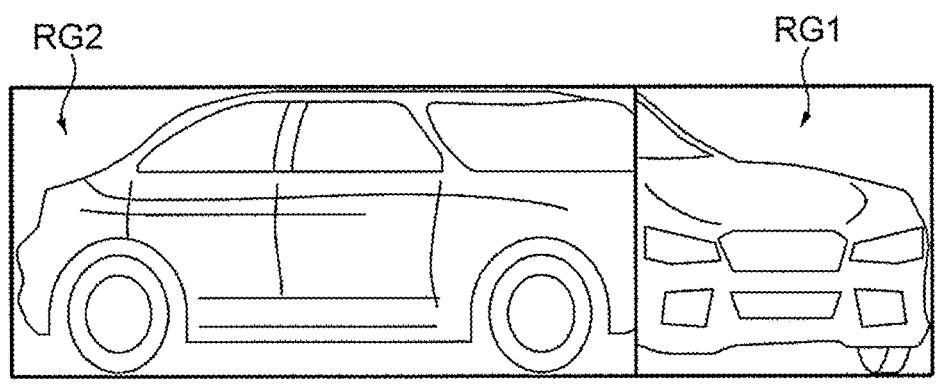

FIG. 3 is a conceptual view illustrating an example of the viewpoint conversion process P4 illustrated in FIG. 2. In the example illustrated in FIG. 3, three-dimensional object information SM is generated by the imaging device V11, which is the external sensor V1, based on image information as external environment information acquired from an oblique direction intersecting a longitudinal direction of a vehicle which is an object. The three-dimensional object information SM can be expressed with an origin coordinate O as a reference using, for example, a three-dimensional orthogonal coordinate system including an X axis parallel to the longitudinal direction of the object, a Y axis parallel to a width direction of the object, and a Z axis parallel to a height direction of the object.

In the viewpoint conversion process P4, the conversion unit 122a converts, for example, image information G1 of a front surface of the object included in the three-dimensional object information SM into perpendicularly facing image information RG1 of the front surface as the perpendicularly facing front surface information obtained by perpendicularly facing the front surface. Further, for example, the conversion unit 122a converts image information G2 of a side surface of the object included in the three-dimensional object information SM into perpendicularly facing image information RG2 of the side surface as the perpendicularly facing side surface information obtained by perpendicularly facing the side surface. The viewpoint conversion process P4 is, for example, image processing based on a virtual viewpoint of viewing the image information G1 and the image information G2 from the front of each surface. Next, the vehicle control device 100 executes, for example, a feature extraction process P5 illustrated in FIG. 2.

Figure 4:
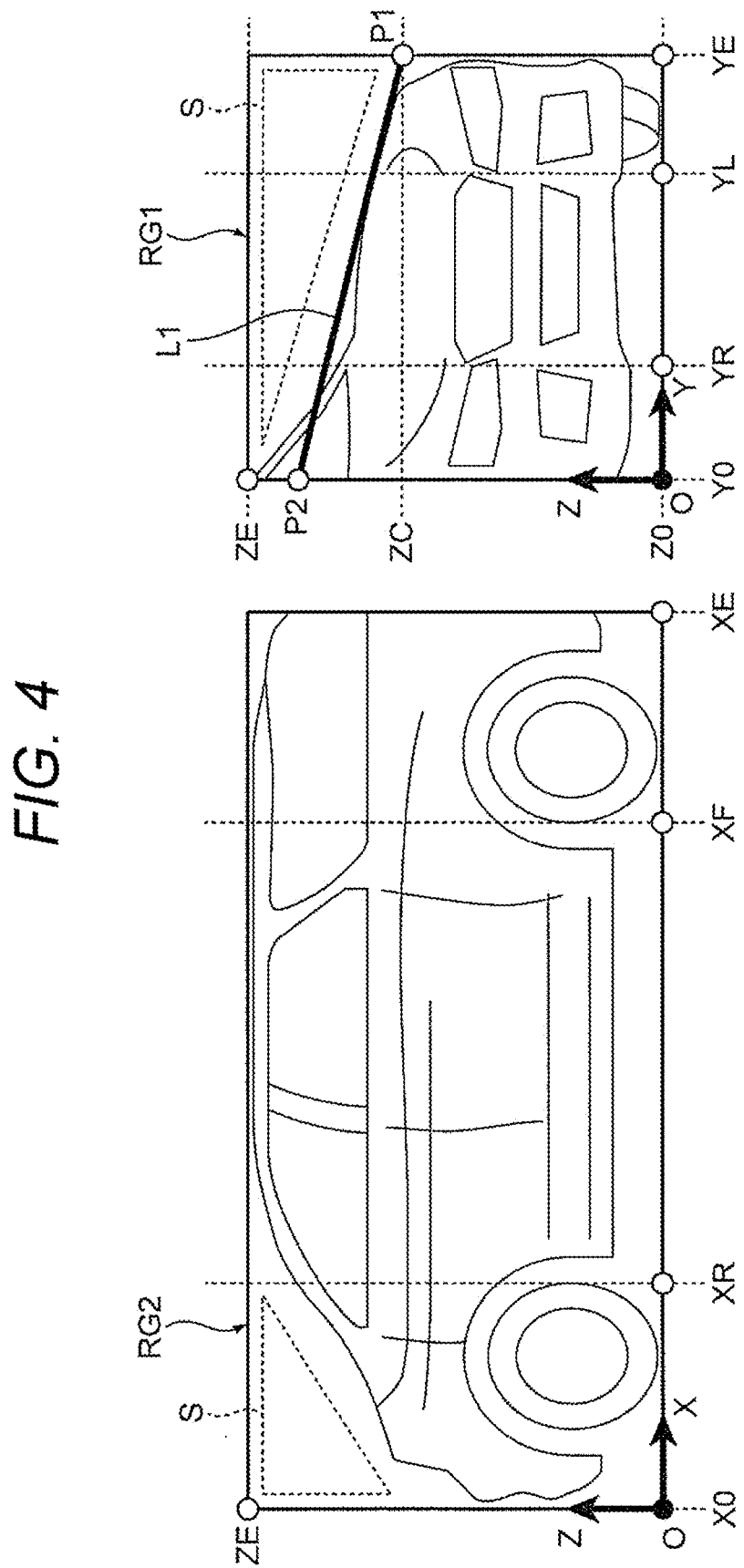
FIG. 4 is an image view illustrating an example of a feature extraction process in FIG. 2.

FIG. 4 is an image view illustrating an example of the feature extraction process P5 illustrated in FIG. 2. In the feature extraction process P5, the vehicle control device 100 causes the feature extraction unit 122b illustrated in FIG. 1 to extract a feature portion, which is a characteristic portion of the object, from the perpendicularly facing image information RG1 and RG2 of the object generated by the conversion unit 122a in the previous process P4, for example. More specifically, in the case where the detected object is the vehicle, the feature extraction unit 122b extracts, for example, wheels as the feature portions from the perpendicularly facing image information RG2 of the side surface of the object.

More specifically, for example, the feature extraction unit 122b performs image recognition processing on the perpendicularly facing image information RG2 of the side surface of the object to recognize the wheel from a shape, a color, brightness, a diameter, and the like of a tire or the wheel. Furthermore, the feature extraction unit 122b defines a central portion of the object, which is the vehicle, based on recognized positions of the wheels, for example. More specifically, the feature extraction unit 122b recognizes a front wheel and a rear wheel of the vehicle from the perpendicularly facing image information RG2 of the side surface of the vehicle, for example, and defines a portion of the vehicle located between a position XF of a rear end of the front wheel and a position XR of a front end of the rear wheel in the longitudinal direction (X-axis direction) of the vehicle as the central portion of the vehicle.

Further, in the case where the detected object is the vehicle, the feature extraction unit 122b extracts, for example, a hood as the feature portion from the perpendicularly facing image information RG1 of the front of the object. More specifically, for example, the feature extraction unit 122b performs image recognition processing on the perpendicularly facing image information RG1 of the front surface of the object, recognizes a boundary line between a vehicle body and the background, and recognizes an inclination line L1 of the hood. Furthermore, the feature extraction unit 122b identifies, for example, intersections P1 and P2 between the recognized inclination line L1 of the hood and both ends in the width direction (Y-axis direction) in the perpendicularly facing image information RG1 of the front surface of the object.

Furthermore, for example, the feature extraction unit 122b selects the intersection P1 at a lower position in the height direction (Z-axis direction) out of the identified intersections P1 and P2, and sets a Z coordinate of the selected intersection P1 as a coordinate ZC for splitting the object, which is the vehicle, into an upper portion and a lower portion. In the example illustrated in FIG. 4, the lower portion of the vehicle is between a coordinate ZO and the coordinate ZC in the height direction (Z-axis direction), and the upper portion of the vehicle is between the coordinate ZC and a coordinate ZE which is a Z-axis coordinate of an upper end of the vehicle.

Furthermore, the feature extraction unit 122b recognizes a region where no object exists from the perpendicularly facing image information RG1 and RG2 of the side surface and the front surface of the object, for example, and defines the region as a space S. In the example illustrated in FIG. 4, in the perpendicularly facing image information RG2 of the side surface of the object, the space S is defined between a coordinate X0 of a rear end in the longitudinal direction (X-axis direction) of the vehicle and a coordinate XR of a rear end of the central portion of the vehicle, and between the coordinate ZC of the lower end and the coordinate ZE of the upper end in the height direction (Z-axis direction) of the vehicle.

Further, in the example illustrated in FIG. 4, in the perpendicularly facing image information RG1 of the front surface of the object, the space S is defined between a coordinate Y0 of one end and a coordinate YE of the other end in the width direction (Y-axis direction) of the vehicle and between the coordinate ZE of the upper end and the coordinate ZC of the lower end in the upper portion of the vehicle in the height direction (Z-axis direction) of the vehicle. Next, as illustrated in FIG. 2, for example, the vehicle control device 100 executes a determination process P6 of determining whether or not the detected object is a person.

In this determination process P6, the feature extraction unit 122b performs image recognition processing using, for example, an image of the imaging device V11 included in the external sensor V1, and determines whether or not the detected object corresponds to any of a pedestrian, a bicycle, and a motorcycle. Note that, in the determination process P6, the feature extraction unit 122b may determine whether or not the detected object corresponds to a pedestrian or the like based on a size, a speed, a motion, a reflection intensity of a millimeter wave radar, and the like of the object, for example, using a detection result of the radar device V12 included in the external sensor V1.

In the determination process P6, for example, when the feature extraction unit 122b determines that the detected object does not correspond to any of a pedestrian, a bicycle, and a motorcycle, that is, does not correspond to a person (NO), the vehicle control device 100 executes a process P7 of generating a split region. On the other hand, in the determination process P6, for example, when the feature extraction unit 122b determines that the detected object corresponds to any of a pedestrian, a bicycle, and a motorcycle, that is, corresponds to a person (YES), the vehicle control device 100 executes a process P8 of setting a damage degree to be described later.

Figure 5:
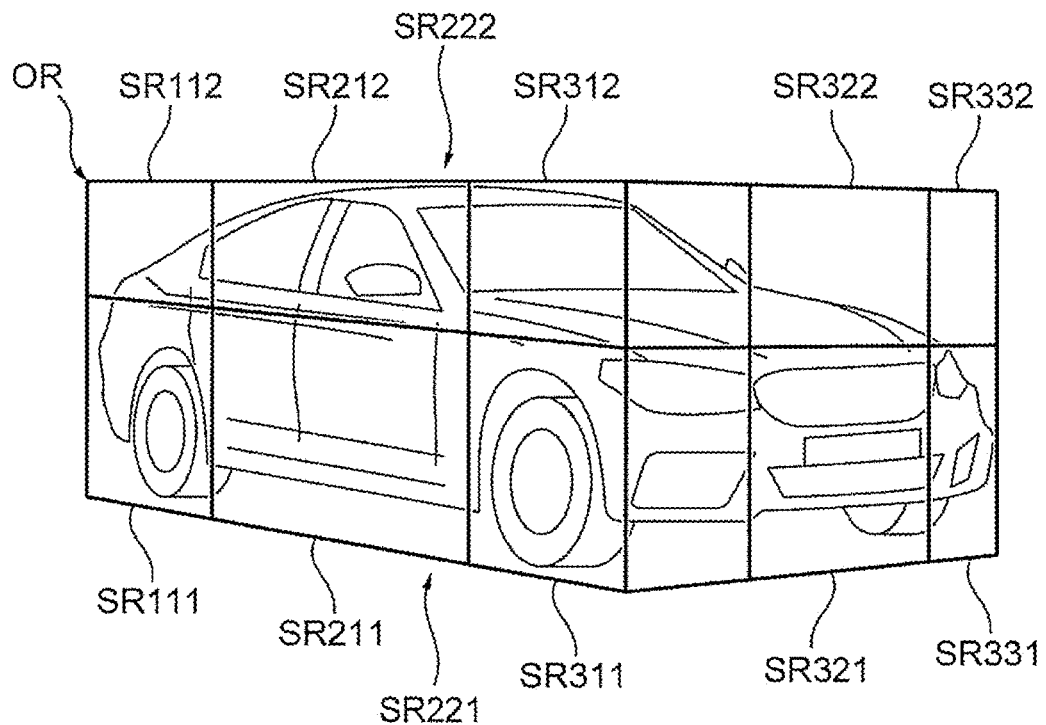
FIG. 5 is an explanatory view of a process of generating a split region in FIG. 2.
Figure 5:
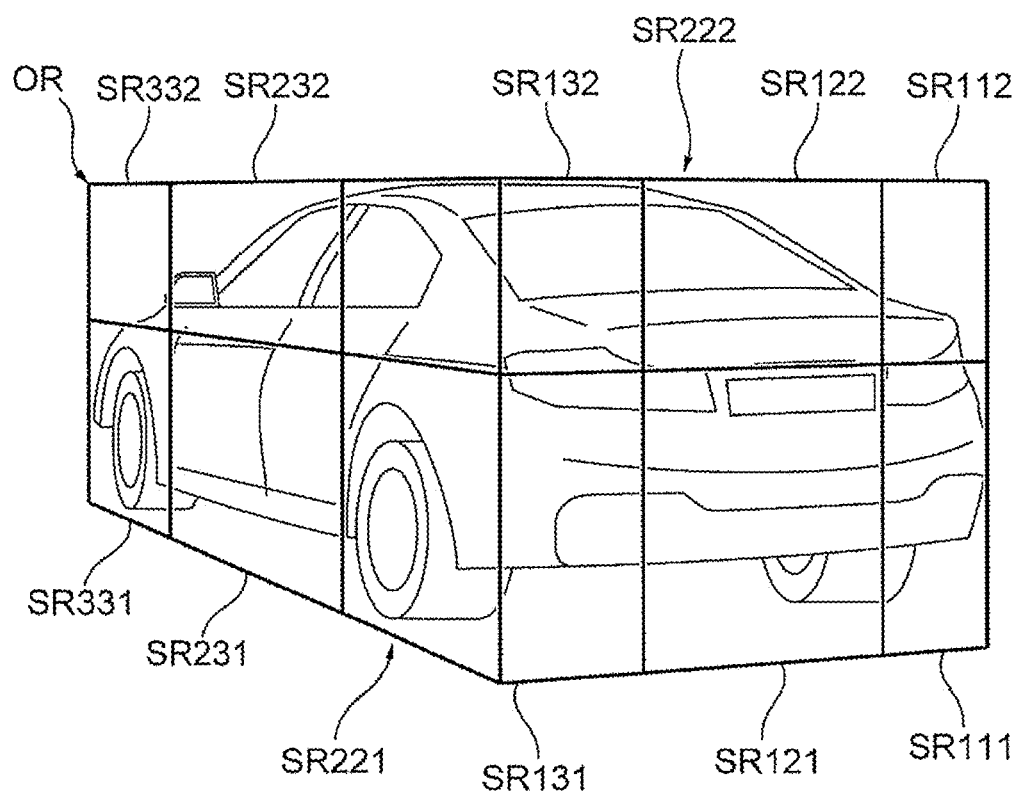

FIG. 5 is an explanatory view of the process P7 of generating a split region SR illustrated in FIG. 2. In the process P7 of generating the split region SR, the vehicle control device 100 generates, for example, information on a plurality of the split regions SR obtained by splitting a target region OR including the object in the longitudinal direction (X-axis direction) and the height direction (Z-axis direction) based on the external environment information by the feature extraction unit 122b. In this process P7, for example, the feature extraction unit 122b further splits the target region OR including the object in the width direction (Y-axis direction) as well to generate the plurality of split regions SR.

In the process P7 of generating the split region SR, the feature extraction unit 122b splits the target region OR at, for example, the position XF of the rear end of the front wheel and the position XR of the front end of the rear wheel in the longitudinal direction (X-axis direction) of the vehicle defined in the above-described feature extraction process P5 illustrated in FIG. 4. Further, in this process P7, the feature extraction unit 122b splits the target region OR at, for example, the coordinate ZC splitting the upper portion and the lower portion in the height direction (Z-axis direction) of the vehicle defined in the above-described feature extraction process P5 illustrated in FIG. 4.

Furthermore, in this process P7, the feature extraction unit 122b splits the target region OR at, for example, a coordinate YR of a position at 25% of a distance from the coordinate Y0 of one end to the coordinate YE of the other end in the width direction (Y-axis direction) of the vehicle illustrated in FIG. 4 and a coordinate YL of a position at 75% of the distance. Such split positions of the target region OR can be set based on, for example, the latest collision safety test, and it is desirable to change the split positions according to the revision of the collision safety test.

As described above, for example, the rectangular parallelepiped target region OR including the object is split into three in the longitudinal direction of the object, split into three in the width direction of the object, and split into two in the height direction of the object, thereby being split into a total of 18 split regions SR. Note that the number of splits of the target region OR in each direction of the object is an example, and it is sufficient to split the target regions OR into two or more in each direction. Further, the target region OR is not necessarily split in the width direction of the object.

In the example illustrated in FIG. 5, the target region OR including the object is split into the plurality of split regions SR as described above, and includes, for example, regions SR111, SR211, and SR311 of a rear portion-right side-lower portion, a central portion-right side-lower portion, and a front portion-right side-lower portion with respect to each direction of the longitudinal direction-width direction-height direction. Further, the plurality of split regions SR include, for example, split regions SR121, SR221, SR321, SR131, SR231, and SR331 of a rear portion-central portion-lower portion, a front portion-central portion-lower portion, a rear portion-left side-lower portion, a central portion-left side-lower portion, and a front portion-left side-lower portion.

Furthermore, the plurality of split regions SR include, for example, regions SR112, SR212, and SR312 of a rear portion-right side-upper portion, a central portion-right side-upper portion, and a front portion-right side-upper portion with respect to each direction of the longitudinal direction-width direction-height direction. Further, the plurality of split regions SR include, for example, split regions SR122, SR222, SR322, SR132, SR232, and SR332 of a rear portion-central portion-upper portion, a front portion-central portion-upper portion, a rear portion-left side-upper portion, a central portion-left side-upper portion, and a front portion-left side-upper portion. After the process P7 of generating the split region SR ends, the vehicle control device 100 executes, for example, the process P8 of setting a damage degree.

Figure 6:
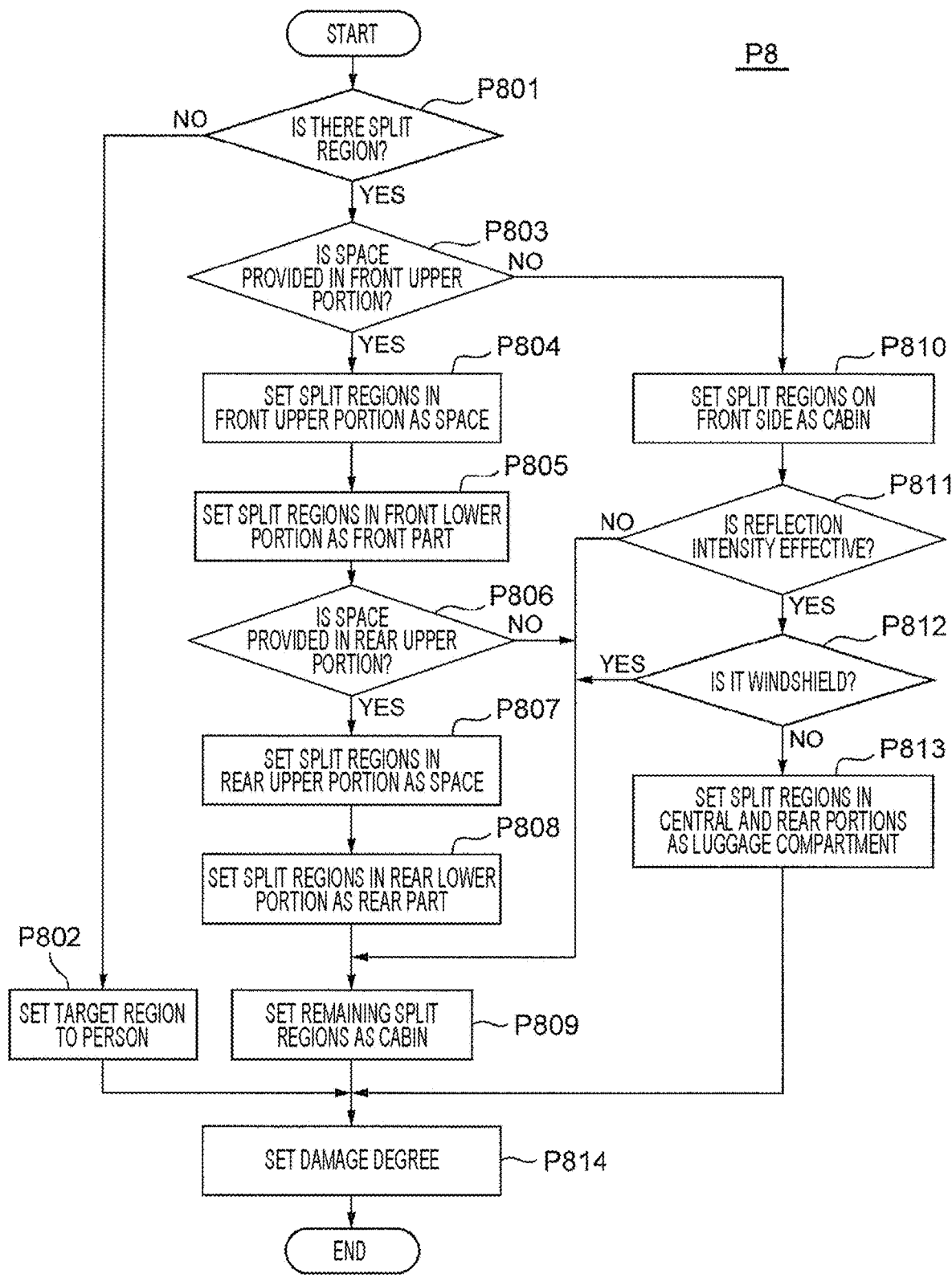
FIG. 6 is a flowchart illustrating details of a process of setting a damage degree in FIG. 2.

FIG. 6 is a flowchart illustrating details of the process P8 of setting the damage degree in FIG. 2. For example, when starting the process P8 illustrated in FIG. 6, the vehicle control device 100 first executes a process P801 of determining whether or not the target region OR including the object has the plurality of split regions SR by the damage degree setting unit 122c. In this process P801, when it is determined that the target region OR does not have the split regions SR (NO), the vehicle control device 100 executes a process P802 of setting the target region OR as a person (a pedestrian, a bicycle, a two-wheeled vehicle, or the like) by the damage degree setting unit 122c, for example, and then executes a process P814 of setting the damage degree to be described later.

On the other hand, for example, when it is determined in the process P801 that the target region OR has the split regions SR (YES), the vehicle control device 100 executes a process P803 of determining whether or not the space S is provided in a front upper portion of the target region OR. In this process P803, for example, the vehicle control device 100 determines whether or not the space S is provided in any one of the split regions SR312, SR322, and SR332 of the front portion-right side-upper portion, the front portion-central portion-upper portion, and the front portion-left side-upper portion among the plurality of split regions SR of the target region OR by the damage degree setting unit 122c.

In this process P803, for example, when it is determined that the predetermined space S is provided in any one of the split regions SR312, SR322, and SR332 (YES), the vehicle control device 100 executes a process P804 of setting the split regions SR in the front upper portion as the space S. In this process P804, for example, the vehicle control device 100 sets the split regions SR312, SR322, and SR332 of the front portion-right side-upper portion, the front portion-central portion-upper portion, and the front portion-left side-upper portion among the plurality of split regions SR of the target region OR as the space S by the damage degree setting unit 122c.

Next, the vehicle control device 100 executes, for example, a process P805 of setting the split regions SR in the front lower portion to a front part. In this process P805, for example, the vehicle control device 100 sets the split regions SR311, SR321, and SR331 of the front portion-right side-lower portion; the front portion-central portion-lower portion; and the front portion-left side-lower portion among the plurality of split regions SR of the target region OR as the front part of the vehicle by the damage degree setting unit 122c.

Next, the vehicle control device 100 executes, for example, a process P806 of determining whether or not the space S is provided in the rear upper portion of the target region OR. In this process P806, for example, the vehicle control device 100 determines whether or not the space S is provided in any one of the split regions SR112, SR122, and SR132 of the rear portion-right side-upper portion, the rear portion-central portion-upper portion, and the rear portion-left side-upper portion among the plurality of split regions SR of the target region OR by the damage degree setting unit 122c.

In this process P806, for example, when it is determined that the predetermined space S is not provided in any of the split regions SR112, SR122, and SR132 (NO), the vehicle control device 100 executes a process P809 of setting the remaining split regions SR as a cabin to be described later.

On the other hand, for example, when it is determined in the above-described process P806 that the predetermined space S is provided in any one of the split regions SR112, SR122, and SR132 (YES), the vehicle control device 100 executes a process P807 of setting the split regions SR in the rear upper portion as the space S. In this process P807, for example, the vehicle control device 100 sets split regions SR112, SR122, and SR132 of the rear portion-right side-upper portion, the rear portion-central portion-upper portion, and the rear portion-left side-upper portion among the plurality of split regions SR of the target region OR as the space S by the damage degree setting unit 122c.

Next, the vehicle control device 100 executes, for example, a process P808 of setting the split regions SR in the rear lower portion as a rear part. In this process P808, for example, the vehicle control device 100 sets the split regions SR111, SR121, and SR131 of the rear portion-right side-lower portion, the rear portion-central portion-lower portion, the rear portion-left side-lower portion among the plurality of split regions SR of the target region OR as the rear part of the vehicle by the damage degree setting unit 122c.

Next, the vehicle control device 100 executes, for example, a process P809 of setting the remaining split regions SR as the cabin. More specifically, for example, when it is determined in the above-described process P806 that the space S is provided in the rear upper portion of the target region OR (YES), the vehicle control device 100 sets each of the following split regions SR as the cabin in the process P809. For example, the vehicle control device 100 sets the split regions SR212, SR222, SR232, SR211, SR221, and SR231 of the central portion-right side-upper portion, the central portion-upper portion, the central portion-left side-upper portion, the central portion-right side-lower portion, the central portion-lower portion, and the central portion-left side-lower portion as the cabin by the damage degree setting unit 122c. Thereafter, the vehicle control device 100 executes the process P814 of setting the damage degree to be described later.

On the other hand, for example, when it is determined in the above-described process P806 that the space S is not provided in the rear upper portion of the target region OR (NO), the vehicle control device 100 sets each of the following split regions SR as the cabin in the process P809 in addition to each of the above-described split regions SR. For example, the vehicle control device 100 sets the split regions SR112, SR122, SR132, SR111, SR121, and SR131 of the rear portion-right side-upper portion, the rear portion-central portion-upper portion, the rear portion-left side-upper portion, the rear portion-right side-lower portion, the rear portion-central portion-lower portion, and the rear portion-left side-lower portion as the cabin by the damage degree setting unit 122c. Thereafter, the vehicle control device 100 executes the process P814 of setting the damage degree to be described later.

Further, when it is determined in the above-described process P803 that the predetermined space S is not provided in any of the split regions SR312, SR322, and SR332 (NO), for example, the vehicle control device 100 executes a process P810 of setting the split regions SR in the front portion as the cabin. More specifically, in this process P810, for example, the vehicle control device 100 sets the split regions SR311, SR321, SR331, SR312, SR322, and SR332 of the front portion-right side-lower portion, the front portion-central portion-lower portion, the front portion-left side-lower portion, the front portion-right side-upper portion, the front portion-central portion-upper portion, the front portion-left side-upper portion among the plurality of split regions SR of the target region OR as the cabin by the damage degree setting unit 122c.

Thereafter, the vehicle control device 100 executes a process P811 of determining whether or not a reflected wave having an effective intensity exceeding a predetermined threshold is obtained from the object based on a detection result of the object by the millimeter wave radar device which is the radar device V12 included in the external sensor V1, for example. In this process P811, for example, when the damage degree setting unit 122c determines that the reflected wave having the effective intensity is not obtained (NO), the vehicle control device 100 executes the above-described process P809.

On the other hand, in the process P811, for example, when the damage degree setting unit 122c determines that the reflected wave having the effective intensity has been obtained (YES), the vehicle control device 100 executes a process P812 of determining whether or not the split region SR including a windshield is provided in the target region OR. In this process P812, for example, the vehicle control device 100 recognizes the split region SR in which a reflected wave of a reflection intensity in a predetermined range having the reflection intensity lower than that of metal is obtained as the split region SR including the windshield by the damage degree setting unit 122c using the detection result of the object by the millimeter wave radar device.

For example, when it is determined in the above-described process P812 that the split regions SR of the central portion-right side-upper portion and the rear portion-right side-upper portion, or the split regions SR of the central portion-left side-upper portion and the rear portion-left side-upper portion include the windshield (YES), the vehicle control device 100 executes the above-described process P809. On the other hand, when it is determined in the above-described process P812 that the split regions SR of the central portion-right side-upper portion and the rear portion-right side-upper portion and the split regions SR of the central portion-left side-upper portion and the rear portion-left side-upper portion do not include the windshield (NO), the vehicle control device 100 executes a process P813 of setting the split regions SR of the central portion and the rear portion in the longitudinal direction as a luggage compartment or a cargo bed.

In this process P813, for example, the vehicle control device 100 sets the split regions SR212, SR222, SR232, SR112, SR122, and SR132 of the central portion-right side-upper portion, the central portion-upper portion, the central portion-left side-upper portion, the rear portion-right side-upper portion, the rear portion-central portion-upper portion, and the rear portion-left side-upper portion among the plurality of split regions SR as the luggage compartment or the cargo bed by the damage degree setting unit 122c. Furthermore, for example, the vehicle control device 100 sets the split regions SR211, SR221, SR231, SR111, SR121, and SR131 of the central portion-right side-lower portion, the central portion-central portion-lower portion, the central portion-left side-lower portion, the rear portion-right side-lower portion, the rear portion-central portion-lower portion, and the rear portion-left side-lower portion among the plurality of split regions SR as the luggage compartment or the cargo bed by the damage degree setting unit 122c. Thereafter, the vehicle control device 100 executes the process P814 of setting the damage degree.

Figure 7:
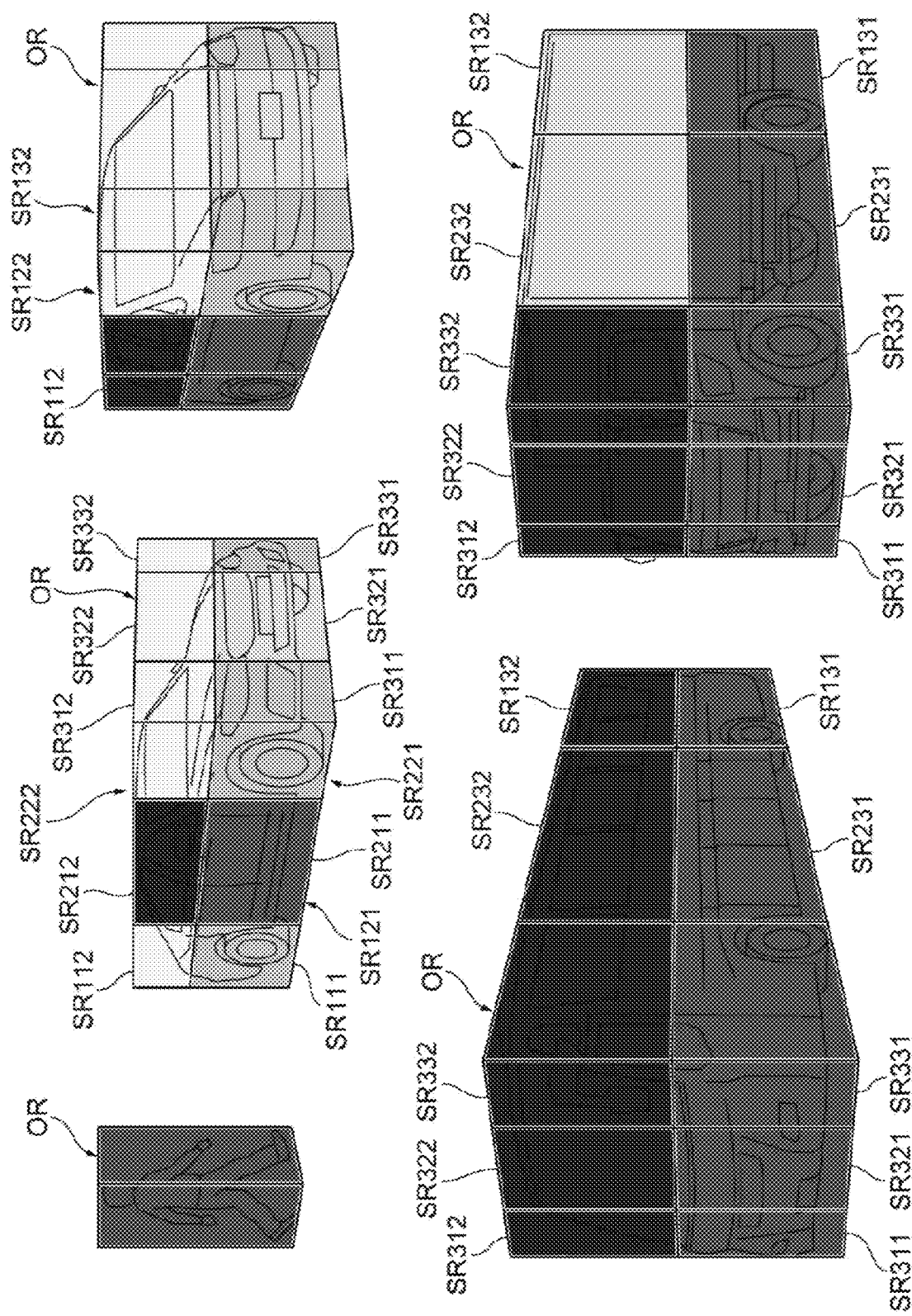
FIG. 7 is a perspective view of a target region for describing an example of a process of setting a damage degree in FIG. 6.

FIG. 7 is a perspective view of the target region OR for describing an example of the process P814 of setting the damage degree in FIG. 6. Further, Table 1 below shows an example of a table used in the process P814 of setting the damage degree. The vehicle absorbs most of kinetic energy at the time of a collision by deformation of a part of the vehicle body. In general, the vehicle body is weak against an impact in the width direction rather than the longitudinal direction, and greatly deforms. Therefore, in Table 1, a damage degree in the cabin is set to be larger than those in the front part and the rear part of the vehicle which are crushable zones.

TABLE 1

| Type/position | | Right side | Central portion | Left side |
|---|---|---|---|---|
| Front part | | 3 | 2 | 3 |
| Cabin | Upper portion | 5 | 5 | 5 |
| Cabin | Lower portion | 4 | 4 | 4 |
| Rear part | | 3 | 2 | 3 |
| Cargo bed | Upper portion | 2 | 2 | 2 |
| Cargo bed | Lower portion | 4 | 4 | 4 |
| Space | | 1 | 1 | 1 |
| Person | | | 10 | |

Further, generally, in a collision in the longitudinal direction of the vehicle, the deformation of the vehicle body is larger in an offset collision in which a part of a front surface of the vehicle collides than in a full-flap collision in which the entire front surface of the vehicle collides. Therefore, in Table 1, the front part and the rear part are set such that the damage degree is larger on the left and right sides than that in the central portion in the width direction. Further, in Table 1, a damage degree of the target region OR including a person is set to be maximized, for example, twice or more a damage degree of the vehicle in order to prevent damage to a person.

More specifically, in a case where the object in the target region OR is set as a person through the process P801 and the process P802 in FIG. 6, the vehicle control device 100 sets the damage degree as follows in the above-described process P814. For example, the vehicle control device 100 sets the damage degree of the target region OR including the person to "10" according to Table 1 by the damage degree setting unit 122c. As a result, the overall damage degree of the target region OR including the person is set to "10" as illustrated in the upper left of FIG. 7.

Further, in a case where the object in the target region OR is set as a sedan-type vehicle through the processes P801 to P806 and P807 to P809 in FIG. 6, the vehicle control device 100 sets the damage degree as follows in the above-described process P814. For example, the vehicle control device 100 sets the damage degree for each of the split regions SR of the target region OR including the sedan-type vehicle illustrated at the upper center of FIG. 7 according to Table 1 by the damage degree setting unit 122c. More specifically, for example, the damage degree setting unit 122c sets all the damage degrees of the split regions SR112, SR122, and SR132 in the rear upper portion and the split regions SR312, SR322, and SR332 in the front upper portion set as the space S to "1".

Further, for example, in the target region OR including the sedan-type vehicle, the damage degree setting unit 122c sets the damage degrees of the split regions SR311, SR321, and SR331 of the front portion-right side-lower portion, the front portion-central portion-lower portion, and the front portion-left side-lower portion set as the front part to "3", "2", and "3", respectively. Similarly, for example, in the target region OR including the sedan-type vehicle, the damage degree setting unit 122c sets each of the damage degrees of the split regions SR212, SR222, and SR232 of the central portion-right side-upper portion, the central portion-central portion-upper portion, and the central portion-left side-upper portion set as the cabin to "5".

Similarly, for example, in the target region OR including the sedan-type vehicle, the damage degree setting unit 122c sets each of the damage degrees of the split regions SR211, SR221, and SR231 of the central portion-right side-lower portion, the central portion-central portion-lower portion, and the central portion-left side-lower portion set as the cabin to "4". Similarly, for example, in the target region OR including the sedan-type vehicle, the damage degree setting unit 122c sets the damage degrees of the split regions SR111, SR121, and SR131 of the rear portion-right side-lower portion, the rear portion-central portion-lower portion, and the rear portion-left side-lower portion set as the rear part to "3", "2", and "3", respectively.

Further, in a case where the object in the target region OR is set as a minivan-type vehicle through the processes P801, P803 to P806, and P809 in FIG. 6, the split regions SR112, SR122, and SR132 of the rear portion-right side-upper portion, the rear portion-central portion-upper portion, and the rear portion-left side-upper portion of the target region OR are set as the cabin. Therefore, in the process P814, the vehicle control device 100 sets the damage degree of each of the split regions SR112, SR122, and SR132 in the rear upper portion of the target region OR including the minivan-type vehicle illustrated in the upper right of FIG. 7 to "5" according to Table 1 by the damage degree setting unit 122c, for example.

Further, in a case where the object in the target region OR is set as a bus illustrated in the lower left of FIG. 7 through the processes P801, P803, P810 to P812, and P809 in FIG. 6, the vehicle control device 100 sets the damage degree as follows in the above-described process P814. For example, the vehicle control device 100 sets the damage degrees of all the split regions SR in the upper portion of the target region OR set as the cabin to "5" and sets the damage degrees of all the split regions SR in the lower portion of the target region OR set as the cabin to "4" according to Table 1 by the damage degree setting unit 122c.

Further, in a case where the object in the target region OR is set as a truck illustrated in the lower right of FIG. 7 through the processes P801, P803, and P810 to P813 in FIG. 6, the vehicle control device 100 sets the damage degree as follows in the above-described process P814. For example, the vehicle control device 100 sets the damage degrees of all the split regions SR in the front upper portion of the target region OR set as the cabin to "5" according to Table 1 by the damage degree setting unit 122c.

Furthermore, for example, the damage degree setting unit 122c sets the damage degrees of the split regions SR212, SR222, SR232, SR112, SR122, and SR132 in the upper central portion and the rear upper portion of the target region OR set as the cargo bed to "2" according to Table 1. Similarly, the damage degree setting unit 122c sets the damage degrees of the split regions SR211, SR221, SR231, SR111, SR121, and SR131 in the lower central portion and the rear lower portion of the target region OR set as the cargo bed to "4" according to Table 1.

In the host vehicle information storage unit 124 illustrated in FIG. 1, for example, information on a plurality of host vehicle split regions VSR obtained by splitting a host vehicle region VOR including the host vehicle V similarly to the target region OR illustrated in FIG. 5, and host vehicle damage degrees set to the plurality of host vehicle split regions VSR, respectively, depending on magnitudes of damage at the time of collision of an object are recorded.

For example, the AD map generation unit 125 illustrated in FIG. 1 generates an automated driving map of the host vehicle V by fusing map information including position information of the host vehicle V and road information around the host vehicle V, which are outputs of the map unit V3, and three-dimensional object information of the object output from the damage degree map generation unit 122. Further, the AD map generation unit 125 generates a planned travel route of the host vehicle V based on information input from, for example, the host vehicle information storage unit 124, the damage degree map generation unit 122, the map unit V3, the vehicle sensor V4, and the like, and outputs the generated planned travel route to the travel control unit 123.

The travel control unit 123 includes, for example, an automated driving determination unit 123a and a vehicle control unit 123b. The automated driving determination unit 123a calculates a control amount for the vehicle drive unit V5 necessary for the automated driving of the host vehicle V based on, for example, the automated driving map and the planned travel route input from the AD map generation unit 125 and various types of sensor information of the host vehicle V input from the vehicle sensor V4. The vehicle control unit 123b controls the vehicle drive unit V5, the display V6, the speaker V7, and the like based on the control amount for the vehicle drive unit V5 calculated by the automated driving determination unit 123a to perform the automated driving or driving assistance of the host vehicle V.

Hereinafter, an operation of the vehicle control device 100 of the present embodiment will be described. As described above, the vehicle control device 100 of the present embodiment is mounted on the host vehicle V, and is connected to, for example, the external sensor V1, the communication unit V2, the map unit V3, the vehicle sensor V4, the vehicle drive unit V5, the display V6, and the speaker V7. The vehicle control device 100 controls the vehicle drive unit V5 by the travel control unit 123, for example, to perform the automated driving or driving assistance of the host vehicle V.

Figure 8:
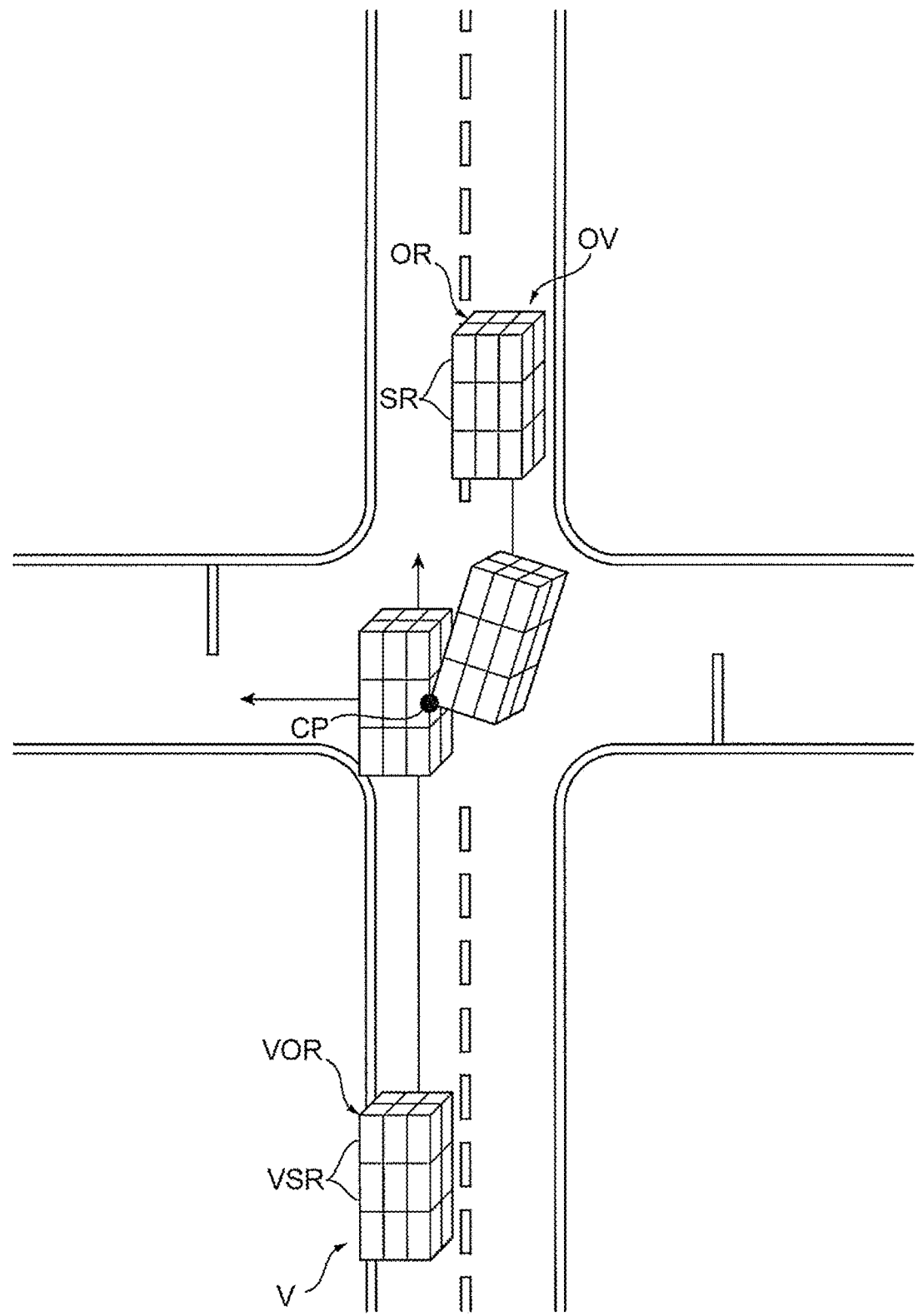
FIG. 8 is an example of an automated driving map generated by an AD map generation unit in FIG. 1.

FIG. 8 is an example of the automated driving map generated by the AD map generation unit 125. In this example, the host vehicle V travels on a road with one lane on each side toward an intersection on the front side, and an oncoming vehicle OV travels on the opposite lane of the road from the opposite direction toward the same intersection. Further, the oncoming vehicle OV is about to turn right at the intersection. The vehicle control device 100 mounted on the host vehicle V generates the automated driving map as illustrated in FIG. 8 based on, for example, map information around the host vehicle V output from the map unit V3.

Further, for example, the vehicle control device 100 reads the three-dimensional object information of the host vehicle V, the host vehicle region VOR, the plurality of host vehicle split regions VSR, and the damage degrees respectively set to the host vehicle split regions VSR from the host vehicle information storage unit 124 by the AD map generation unit 125, and reflects the three-dimensional object information, the host vehicle region VOR, the plurality of host vehicle split regions VSR, and the damage degrees on the automated driving map. Further, the vehicle control device 100 generates three-dimensional object information by the three-dimensional object information generation unit 121 based on, for example, information on the oncoming vehicle OV detected by the external sensor V1. Furthermore, for example, the vehicle control device 100 sets the target region OR and the plurality of split regions SR in the oncoming vehicle OV based on the generated three-dimensional object information by the damage degree map generation unit 122 as illustrated in FIGS. 3 to 7 and Table 1, and sets a damage degree to each of the split regions SR.

For example, the vehicle control device 100 estimates travel routes of the oncoming vehicle OV and the host vehicle V by the automated driving determination unit 123a as illustrated in FIG. 8 based on the information on the oncoming vehicle OV input from the external sensor V1 and the sensor information input from the vehicle sensor V4. Further, for example, the automated driving determination unit 123a determines a likelihood of a collision between the host vehicle V and the oncoming vehicle OV based on the estimated travel routes, and determines whether or not the collision between the host vehicle V and the oncoming vehicle OV is avoidable by the control of the vehicle drive unit V5 when the collision is likely to occur.

When it is determined that the collision between the host vehicle V and the oncoming vehicle OV is avoidable, the vehicle control device 100 controls the vehicle drive unit V5 by the vehicle control unit 123b, for example. As a result, the throttle, the brake, the steering, and the like of the host vehicle V are automatically operated, and the collision between the host vehicle V and the oncoming vehicle OV is avoided. On the other hand, when the vehicle control device 100 determines that the collision between the host vehicle V and the oncoming vehicle OV is not avoidable, for example, the automated driving determination unit 123a calculates positions of the host vehicle V and the oncoming vehicle OV after a lapse of a predetermined time to calculate a collision position CP.

Figure 9:
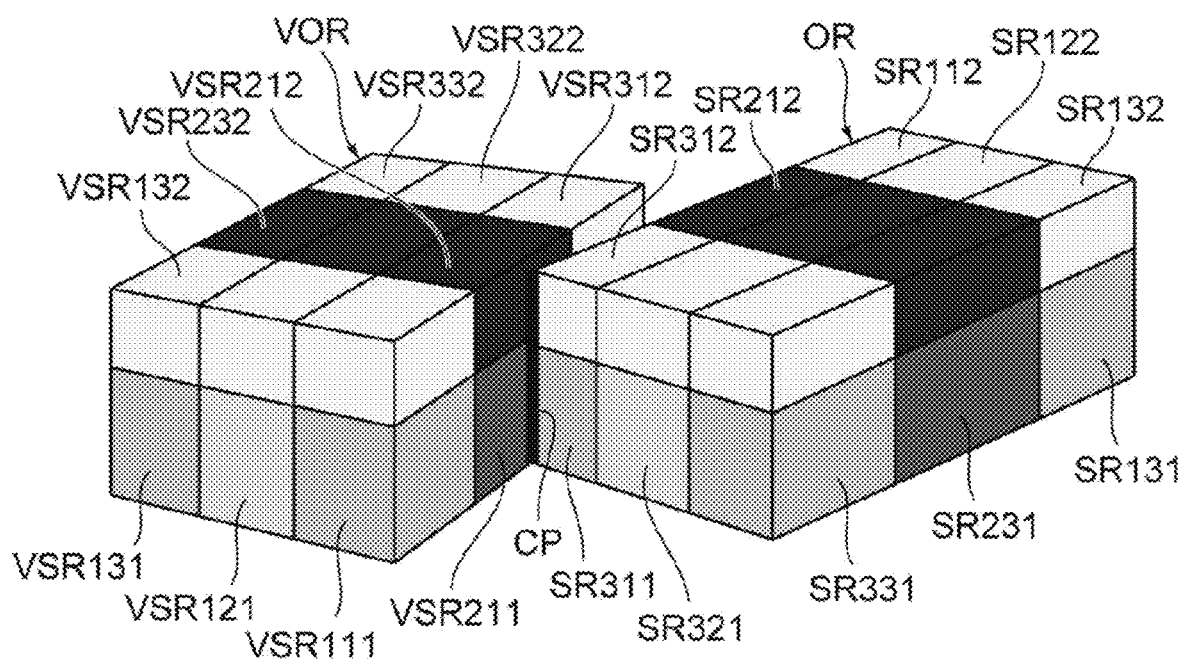
FIG. 9 is an example of a calculation result of a collision position between a host vehicle and an oncoming vehicle by an automated driving determination unit in FIG. 1.

FIG. 9 is an example of calculation results of the collision position CP and collision damage degrees of the host vehicle V and the oncoming vehicle OV by the automated driving determination unit 123a. In the example illustrated in FIG. 9, both the host vehicle V and the oncoming vehicle OV are vehicles of a sedan type illustrated at the upper center of FIG. 7. Further, the host vehicle V and the oncoming vehicle OV are predicted to collide at the collision position CP between the host vehicle split regions VSR211 and VSR212 in the central portion-right side-lower portion and the central portion-right side-upper portion of the host vehicle V, and the split regions SR311 and 312 in the front portion-right side-lower portion and the front portion-right side-upper portion of the oncoming vehicle OV.

In this case, the host vehicle split regions VSR211 and VSR212 of the host vehicle V including the collision position CP are the upper right side of the cabin and the lower right side of the cabin, respectively, and the host vehicle damage degrees thereof are set to "5" and "4", respectively, as illustrated in Table 1. Further, the split regions SR312 and 313 including the collision position CP of the oncoming vehicle OV are the space S and the right side of the front part, respectively, and the damage degrees thereof are set to "1" and "3", respectively, as illustrated in Table 1. Therefore, the collision damage degree between the host vehicle V and the oncoming vehicle OV illustrated in FIG. 9 is calculated, for example, as illustrated in a table of FIG. 9 by the automated driving determination unit 123a.

For example, the collision damage degree between the host vehicle V and the oncoming vehicle OV can be obtained as a value corresponding to a product of the host vehicle damage degree set in the host vehicle split region VSR of the host vehicle V and the damage degree set in the split region SR of the oncoming vehicle OV. In the example illustrated in the table of FIG. 9, a coefficient is set to "3", the split regions SR of the host vehicle V and the oncoming vehicle OV are divided into the upper portion and the lower portion, a product of the host vehicle damage degree of the host vehicle V, the damage degree of the oncoming vehicle OV, and the coefficient is calculated as the collision damage degree, and a sum of the collision damage degrees is set as an overall collision damage degree. This coefficient is a numerical value set according to a relative speed and a weight of an object colliding with the host vehicle V, and is not limited to "3".

Here, for example, the vehicle control device 100 controls the travel of the host vehicle V by the automated driving determination unit 123a of the travel control unit 123 so as to minimize the collision damage degree corresponding to the host vehicle damage degree and the damage degree set in the host vehicle split region VSR of the host vehicle V and the split region SR of the oncoming vehicle OV. More specifically, for example, as illustrated in Table 2 below, the travel control unit 123 calculates the collision damage degree for each combination of steering angle control and acceleration/deceleration control that can be implemented between a current time and a predicted collision time by the automated driving determination unit 123a.

TABLE 2

| | | Acceleration/deceleration control | | |
|---|---|---|---|---|
| | | Maintenance | Acceleration | Deceleration |
| Steering angle control | Maintenance | 51 | 40 | 7 |
| | Rightward steering | 30 | 40 | 10 |
| | Leftward steering | 30 | 40 | 10 |

In the example illustrated in Table 2, for example, the travel control unit 123 calculates the collision damage degrees respectively for combinations of three types of steering angle control including steering angle maintenance, rightward steering, and leftward steering, and three types of acceleration/deceleration control including vehicle speed maintenance, acceleration, and deceleration by the automated driving determination unit 123a. As a result, for example, the collision damage degree in the case of performing vehicle control in which the steering angle maintenance is performed as the steering angle control and the deceleration is performed as the acceleration/deceleration control is "7", which is the minimum.

This is because the collision position CP illustrated in FIG. 9 is changed by the above-described vehicle control, for example, between the host vehicle split region VSR321 of the front portion-central portion-lower portion, which is the front part of the host vehicle V, and the split region SR331 of the front portion-left portion-lower portion which is the front part of the oncoming vehicle OV. In this case, for example, the travel control unit 123 controls the vehicle drive unit V5 by the vehicle control unit 123b to execute the above-described vehicle control in which the collision damage degree is minimized. As a result, the front part of the host vehicle V and the front part of the oncoming vehicle OV collide with each other to cause the crushable zones of the both to absorb an impact, thereby minimizing the collision damage.

As described above, the vehicle control device 100 of the present embodiment is a control device mounted on the vehicle V, and includes the three-dimensional object information generation unit 121, the damage degree map generation unit 122, and the travel control unit 123. The three-dimensional object information generation unit 121 detects an object around the vehicle V and generates three-dimensional object information based on external environment information output from the external sensor V1 mounted on the vehicle V. The damage degree map generation unit 122 generates information on the plurality of split regions SR obtained by splitting the target region OR including the object in each of the longitudinal direction and the height direction based on the generated external environment information, and sets damage degrees respectively to the plurality of split regions SR according to magnitudes of damage at the time of collision of the vehicle V. Then, the travel control unit 123 controls the travel of the vehicle V so as to minimize a collision damage degree corresponding to the damage degrees set to the split regions SR.

With such a configuration, the vehicle control device 100 of the present embodiment can generate the three-dimensional object information of the obstacle based on the external environment information output from the external sensor V1 when the obstacle such as the oncoming vehicle OV is detected by the external sensor V1. Furthermore, the vehicle control device 100 of the present embodiment can generate the information on the plurality of split regions SR obtained by splitting the target region OR including the obstacle in each of the longitudinal direction and the height direction of the obstacle based on the generated three-dimensional object information, and set the damage degrees to the split regions SR, respectively. As a result, risk can be estimated in more detail than a conventional vehicle control device in accordance with the longitudinal direction and the height direction of the obstacle, and the travel control unit 123 can control the travel of the vehicle V so as to avoid the collision with the obstacle or minimize the collision damage degree.

Further, the vehicle control device 100 of the present embodiment further includes the conversion unit 122a and the feature extraction unit 122b. The conversion unit 122a converts information on a front surface and a side surface of the object included in the three-dimensional object information based on external environment information acquired from an oblique direction intersecting the longitudinal direction of the object by the external sensor V1 into perpendicularly facing front surface information and perpendicularly facing side surface information obtained by perpendicularly facing the front surface and the side surface, respectively. The feature extraction unit 122b extracts a feature portion of the object from the perpendicularly facing side surface information. The damage degree map generation unit 122 splits the target region OR into the plurality of split regions SR in the longitudinal direction based on the extracted feature portion.

With this configuration, the vehicle control device 100 of the present embodiment can obtain the perpendicularly facing front surface information and the perpendicularly facing side surface information obtained by perpendicularly facing the front surface and the side surface of the object, respectively, even when the external environment information of the object such as the oncoming vehicle OV is acquired from the oblique direction by the imaging device V11 and the radar device V12. Furthermore, the vehicle control device 100 of the present embodiment can more accurately extract the feature portion of the object based on the obtained perpendicularly facing front surface information and perpendicularly facing side surface information. As a result, it is possible to more accurately generate the plurality of split regions SR according to the feature of the object, and more accurately estimate a type and risk of the obstacle than the conventional vehicle control device.

Further, in the vehicle control device 100 of the present embodiment, the external sensor V1 includes the imaging device V11, and the external environment information includes image information of the object captured by the imaging device V11. Further, the information on the front surface and the side surface of the object included in the three-dimensional object information is image information of the front surface and the side surface of the object captured from the oblique direction, and the perpendicularly facing front surface information and the perpendicularly facing side surface information are perpendicularly facing image information of the front surface of the object and perpendicularly facing image information of the side surface of the object, respectively.

With this configuration, the vehicle control device 100 of the present embodiment can obtain the perpendicularly facing image information RG1 and the perpendicularly facing image information RG2 obtained by perpendicularly facing the front surface and the side surface of the object, respectively, even when the image of the object such as the oncoming vehicle OV is captured by the imaging device V11 from the oblique direction. Furthermore, the vehicle control device 100 of the present embodiment can more accurately extract the feature portion of the object based on the obtained perpendicularly facing image information RG1 and perpendicularly facing image information RG2. As a result, it is possible to more accurately generate the plurality of split regions SR according to the feature of the object, and more accurately estimate a type and risk of the obstacle than the conventional vehicle control device.

Further, the vehicle control device 100 of the present embodiment further includes the host vehicle information storage unit 124. The host vehicle information storage unit 124 records information on the plurality of host vehicle split regions VSR obtained by splitting the host vehicle region VOR including the vehicle V, and a host vehicle damage degree set to each of the plurality of host vehicle split regions VSR depending on a magnitude of damage at the time of collision of the object. Further, the travel control unit 123 controls the travel of the vehicle V such that the collision damage degree corresponding to a product of the damage degree and the host vehicle damage degree is minimized.

With this configuration, the vehicle control device 100 of the present embodiment can more accurately estimate the collision damage degree based on the host vehicle damage degree set in each of the plurality of host vehicle split regions VSR of the host vehicle V and the damage degree set in each of the plurality of split regions SR of the target region OR. Therefore, it is possible to further reduce the risk due to the collision between the host vehicle V and the object by controlling the travel of the vehicle V using the travel control unit 123 so as to minimize the collision damage degree.

Further, in the vehicle control device 100 of the present embodiment, the feature extraction unit 122b recognizes a region where no object exists from the perpendicularly facing side surface information and defines the region as the space S, and sets the split region SR where an object exists as a part of the vehicle V based on the space S and the plurality of split regions SR. With this configuration, a type of the vehicle detected by the external sensor V1 can be more accurately identified as illustrated in FIG. 5, and the damage degree according to the type and a portion of the vehicle can be set in each of the split regions SR as illustrated in FIG. 7 and Table 1.

Further, the external sensor V1 includes, for example, a millimeter wave radar device serving as the radar device V12 in the vehicle control device 100 of the present embodiment. Further, the damage degree map generation unit 122 recognizes the split region SR including a windshield based on a radar reflection intensity output from the millimeter wave radar device, and sets a damage degree corresponding to a cabin of the vehicle to the split region SR including the windshield among the plurality of split regions SR. With this configuration, it is possible to identify the cabin of the vehicle such as the oncoming vehicle OV based on the external environment information output from the millimeter wave radar device.

Further, the vehicle control device 100 of the present embodiment can be mounted on not only the host vehicle V of a sedan type but also various types of vehicles as illustrated in FIG. 7, and collision damage degrees of various types of vehicles can be estimated more accurately than the conventional vehicle control device. Further, it is possible to accurately estimate not only the collision with the oncoming vehicle OV as illustrated in FIGS. 8 and 9 but also a collision damage degree and the like at the time of a rear-end collision of the host vehicle V. Hereinafter, a calculation example of the collision damage degree by the automated driving determination unit 123a will be described with reference to FIGS. 10 to 13.

Figure 10:
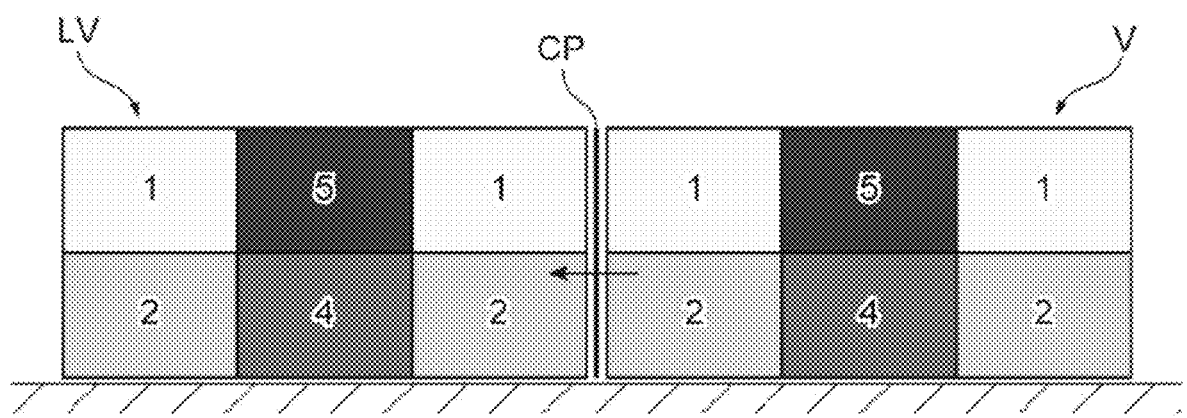
FIG. 10 is a calculation example of a collision damage degree by the automated driving determination unit in FIG. 1.
Figure 11:
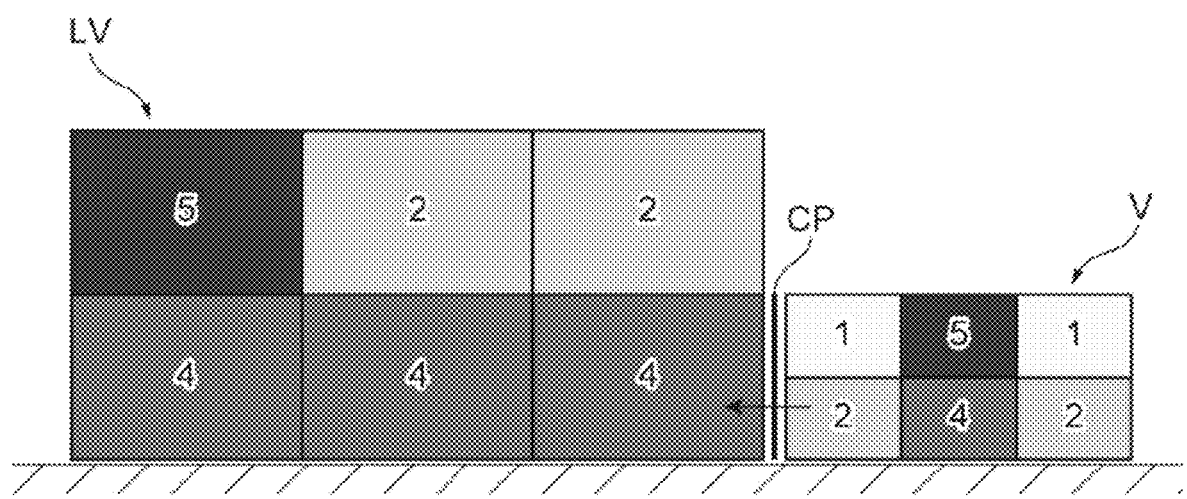
FIG. 11 is a calculation example of the collision damage degree by the automated driving determination unit in FIG. 1.

FIG. 10 illustrates a case where a front portion of the sedan-type host vehicle V collides with the collision position CP of a rear portion of a sedan-type preceding vehicle LV which is stopped. In this case, for example, collision damage degrees of an upper portion of the preceding vehicle LV with an upper portion and a lower portion of the host vehicle V are "3" and "12", respectively, and an overall collision damage degree is "15". FIG. 11 illustrates a case where a front portion of the sedan-type host vehicle V collides with the collision position CP of a rear portion of a stopped truck which is the preceding vehicle LV. In this case, for example, collision damage degrees of a lower portion of the preceding vehicle LV with an upper portion and a lower portion of the host vehicle V are "12" and "24", respectively, and an overall collision damage degree is "36".

As illustrated in FIG. 10, the collision damage degrees are larger in the case where the sedan-type vehicle collides with a rear end of the truck as illustrated in FIG. 11 than those in the case where the sedan-type vehicle collides with a rear end of the sedan-type vehicle. This is because the sedan-type vehicle having an overall height lower than that of the truck collides with a lower portion of a cargo bed of the truck where drive components are exposed.

Figure 12:
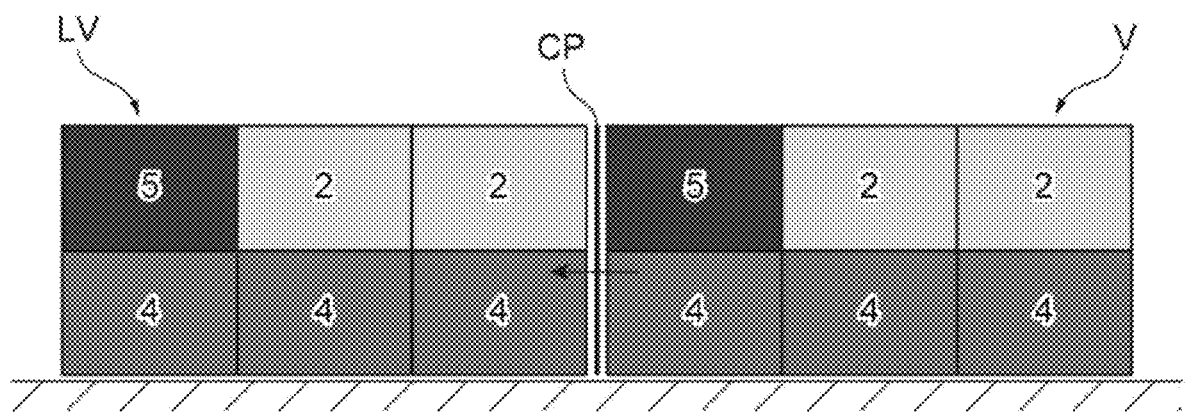
FIG. 12 is a calculation example of the collision damage degree by the automated driving determination unit in FIG. 1.
Figure 13:
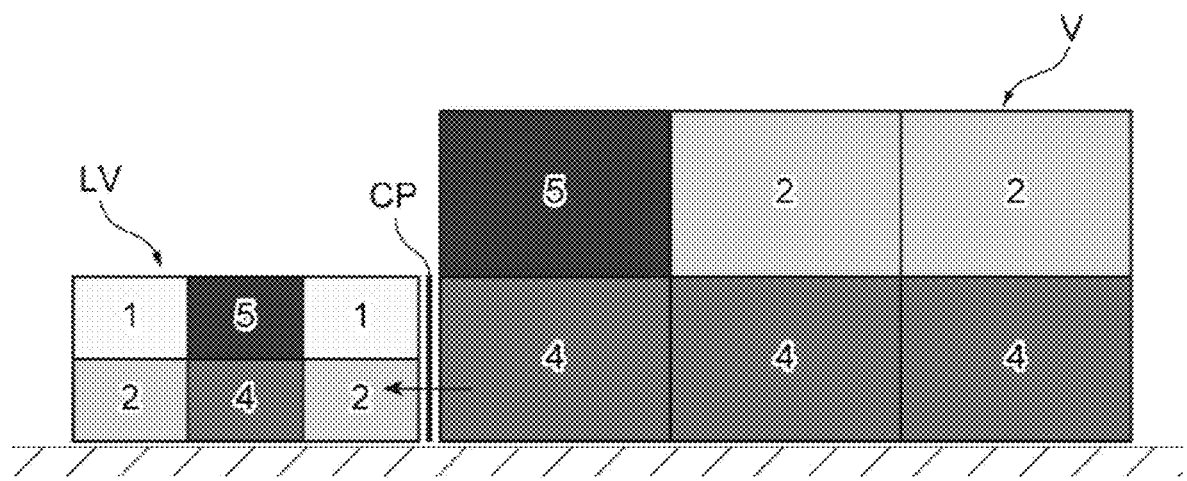
FIG. 13 is a calculation example of the collision damage degree by the automated driving determination unit in FIG. 1.

FIG. 12 illustrates a case where a front portion of the host vehicle V, which is a truck, collides with the collision position CP of a rear portion of a stopped truck which is the preceding vehicle LV. In this case, for example, collision damage degrees between upper portions and between lower portions of the preceding vehicle LV and the host vehicle V are "30" and "48", respectively, and an overall collision damage degree is "78". FIG. 13 illustrates a case where a front portion of the host vehicle V, which is a truck, collides with the collision position CP of a rear portion of the sedan-type preceding vehicle LV which is stopped. In this case, for example, collision damage degrees of an upper portion and a lower portion of the preceding vehicle LV with a lower portion of the host vehicle V are "12" and "24", respectively, and an overall collision damage degree is "36".

As illustrated in FIG. 13, the collision damage degrees are larger in the case where the host vehicle V, which is the truck, collides with the rear portion of the truck, which is the preceding vehicle LV, than those in the case where host vehicle V, which is v truck, collides with a rear end of the sedan-type preceding vehicle LV as illustrated in FIG. 12. This is because a cabin of the truck is disposed on the front side of a vehicle body, and a windshield is located in a front upper portion of the vehicle body. More specifically, in a case where a following truck collides with a rear end of a preceding sedan-type vehicle having an overall height lower than that of the truck, a windshield of the following truck is less likely to be affected by the collision, and thus a collision damage degree becomes relatively small. However, in a case where a following truck collides with a preceding truck, a windshield of the following truck is affected by the collision, and thus, a collision damage degree becomes relatively large.

As described above, it is possible to provide the vehicle control device 100 capable of more accurately estimating the type and risk of the obstacle than the conventional vehicle control device, and more reliably avoiding the collision between the obstacle and the vehicle V or reducing the collision damage according to the present embodiment.

Second Embodiment

Next, a second embodiment of the vehicle control device according to the present disclosure will be described. A vehicle control device 100 of the present embodiment is different from the vehicle control device 100 of the first embodiment in that a damage degree map generation unit 122 acquires information on an object transmitted from the outside of a host vehicle V via a communication unit V2 mounted on the host vehicle V. The other points of the vehicle control device 100 of the present embodiment are similar to those of the vehicle control device 100 of the first embodiment, and thus, similar portions will be denoted by the same reference signs, and the description thereof will be omitted.

Figure 14:
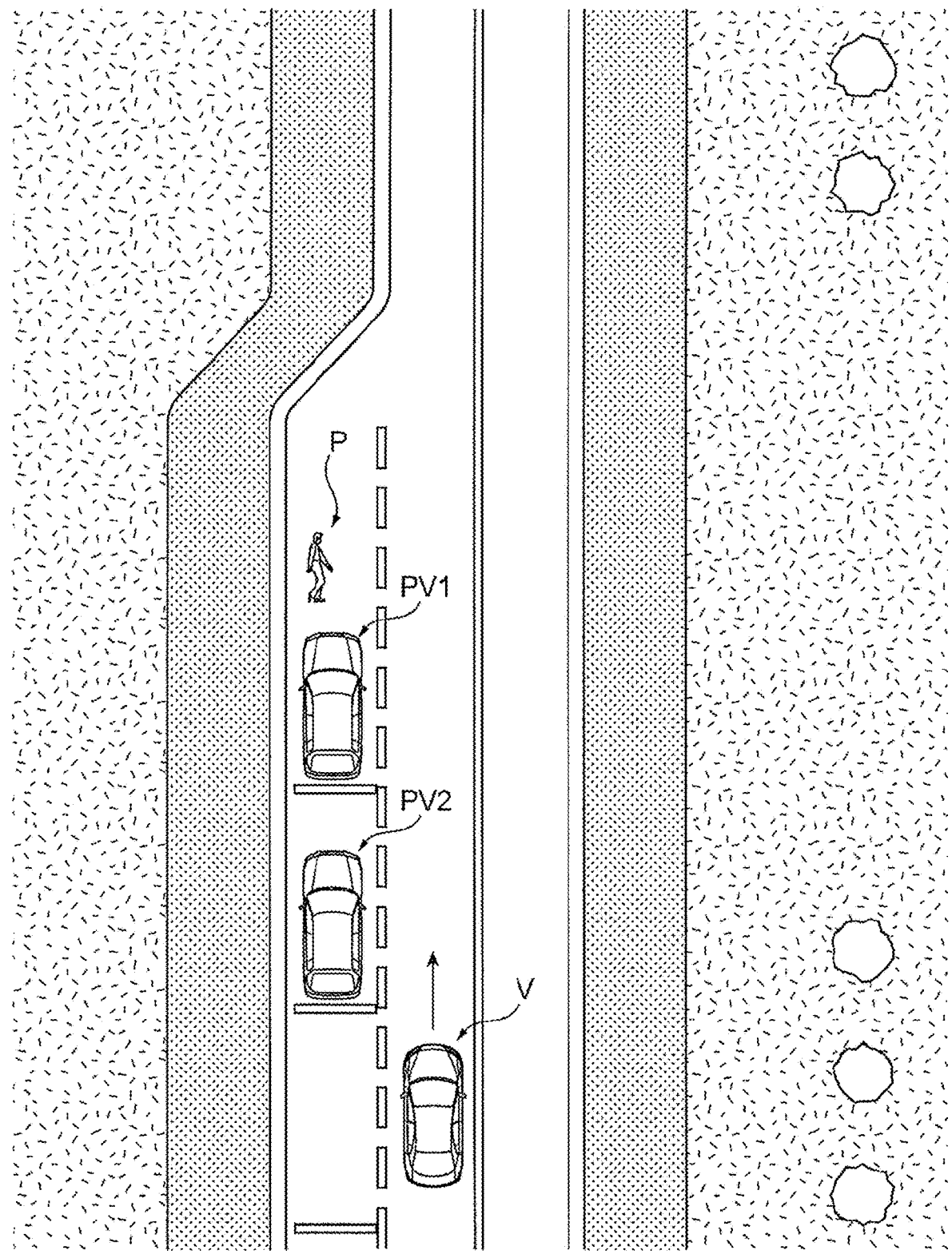
FIG. 14 is a plan view for describing an operation of a second embodiment of the vehicle control device according to the present disclosure.

FIG. 14 is a plan view for describing an operation of the vehicle control device 100 of the present embodiment. The host vehicle V equipped with the vehicle control device 100 illustrated in FIG. 1 travels straight on a road with one lane on each side. Two parked vehicles PV1 and PV2 are parked in parallel in a parking space provided next to the road. These parked vehicles PV1 and PV2 have the same configurations as the host vehicle V illustrated in FIG. 1, and are each equipped with the vehicle control device 100. Even during parking, the parked vehicles PV1 and PV2 detect an object around the parked vehicles PV1 and PV2 by external sensors V1.

In the example illustrated in FIG. 14, the external sensor V1 mounted on the parked vehicle PV1 at the head parked on the front side in a progressing direction of the host vehicle V detects a pedestrian P who is about to cross the road. The pedestrian P is located in a blind spot of the external sensor V1 of the parked vehicle PV2 parked behind the parked vehicle PV1 and the external sensor V1 of the host vehicle V by being hidden behind the parked vehicle PV1 at the head.

In this case, the vehicle control device 100 of the host vehicle V receives, via a communication unit V2 of the host vehicle V, for example, information including three-dimensional object information, a speed, a moving direction, and the like of the pedestrian P transmitted from a communication unit V2 of the parked vehicle PV1 on the front side. For example, the vehicle control device 100 of the host vehicle V sets a target region OR and a damage degree of the pedestrian P by a damage degree map generation unit 122 based on the three-dimensional object information of the pedestrian P received via the communication unit V2. Further, the vehicle control device 100 of the host vehicle V estimates a walking route of the pedestrian P by an automated driving determination unit 123a based on the information such as the speed and the moving direction of the pedestrian P received via the communication unit V2, for example.

Further, the vehicle control device 100 estimates a travel route of the host vehicle V by the automated driving determination unit 123a based on, for example, information input from an AD map generation unit 125 or a vehicle sensor V4. Further, for example, the automated driving determination unit 123a determines a likelihood of a collision between the host vehicle V and the pedestrian P based on the estimated travel route, and determines whether or not a collision between the host vehicle V and the oncoming vehicle OV is avoidable by control of a vehicle drive unit V5 when the collision is likely to occur.

Figure 15:
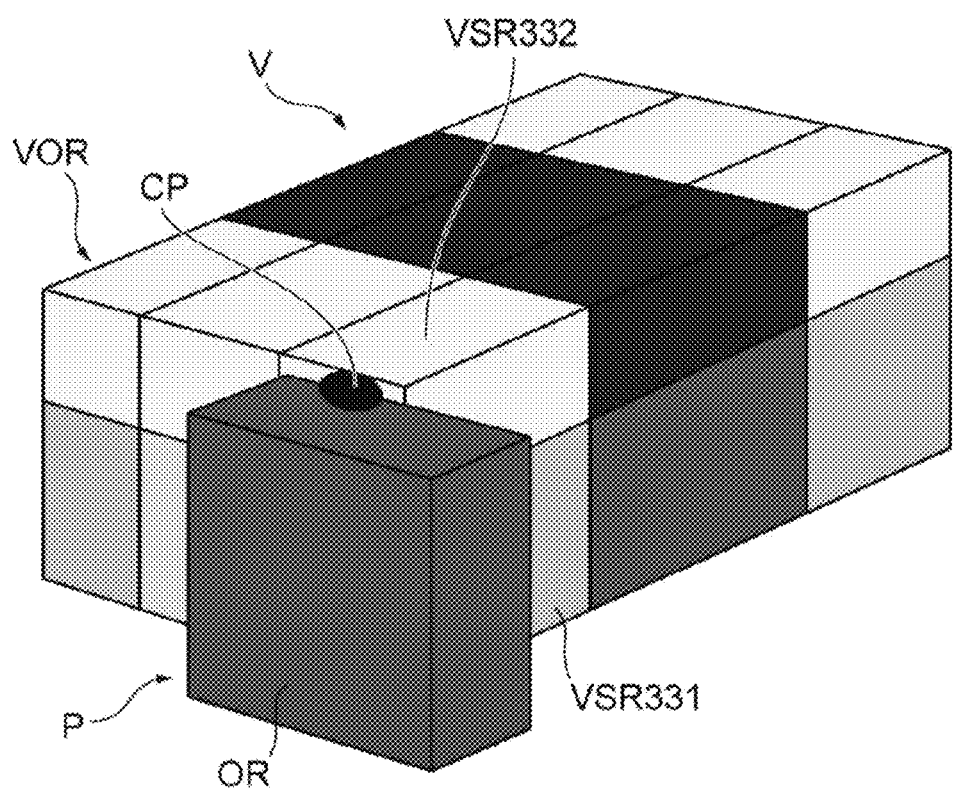
FIG. 15 is an example of a calculation result by an automated driving determination unit of the vehicle control device according to the second embodiment.

FIG. 15 is an example of a calculation result of a collision position CP and a collision damage degree between the host vehicle V and the pedestrian P obtained by the automated driving determination unit 123a of the vehicle control device 100 of the host vehicle V. For example, the vehicle control device 100 calculates the collision position CP based on the estimated walking route and moving speed of the pedestrian P and the travel route and a moving speed of the host vehicle V by the automated driving determination unit 123a. Furthermore, the vehicle control device 100 calculates the collision damage degree as illustrated in a table of FIG. 15 by the damage degree map generation unit 122, for example, based on the calculated collision position CP.

In the example illustrated in FIG. 15, the host vehicle V is a sedan-type vehicle, host vehicle split regions VSR331 and VSR332 of a front portion-left side-lower portion and a front portion-left side-upper portion are set to a front part and a space S, respectively, and damage degrees thereof are set to "3" and "1", respectively. Further, an overall damage degree of the target region OR of the pedestrian P is set to, for example, "10". Further, a coefficient is set to "3", for example. Therefore, the collision damage degree of an upper portion and a lower portion of the host vehicle V and pedestrian P are "30" and "90", respectively, and an overall collision damage degree is "120".

Next, the vehicle control device 100 causes a travel control unit 123 to control travel of the host vehicle V so as to minimize the collision damage degree corresponding to the damage degrees of the host vehicle V and the pedestrian P illustrated in FIG. 15. More specifically, for example, as illustrated in Table 3 below, the travel control unit 123 calculates the collision damage degree for each combination of steering angle control and acceleration/deceleration control that can be implemented between a current time and a predicted collision time by the automated driving determination unit 123a.

TABLE 3

|  |  | Acceleration/deceleration control | | |
|---|---|---|---|---|
|  |  | Maintenance | Acceleration | Deceleration |
| Steering angle control | Maintenance | 120 | 120 | 0 |
|  | Rightward steering | 120 | 120 | 40 |
|  | Leftward steering | — | — | — |

In the example illustrated in Table 3, for example, the travel control unit 123 calculates the collision damage degrees respectively for combinations of three types of steering angle control including steering angle maintenance, rightward steering, and leftward steering, and three types of acceleration/deceleration control including vehicle speed maintenance, acceleration, and deceleration by the automated driving determination unit 123a. As a result, for example, the collision damage degree in the case of performing vehicle control in which the steering angle maintenance is performed as the steering angle control and the deceleration is performed as the acceleration/deceleration control is "0", which is the minimum, and collision avoidance is possible. In this case, for example, the travel control unit 123 controls the vehicle drive unit V5 by the vehicle control unit 123b to execute the above-described vehicle control in which the collision damage degree is minimized. As a result, the host vehicle V is decelerated in front of the pedestrian P, and the collision with the pedestrian P can be avoided.

Although the embodiments of the vehicle control device according to the present disclosure have been described in detail with reference to the drawings as above, specific configurations are not limited to the embodiments, and design alterations or the like made in a scope not departing from a gist of the present disclosure are also included in the present disclosure.

For example, in the above-described embodiments, the example has been described in which the image information G1 and the image information G2 of the front surface and the side surface of the object included in the three-dimensional object information SI based on the image information of the object captured by the imaging device V11 are converted into the perpendicularly facing image information RG1 and the perpendicularly facing image information RG2 obtained by perpendicularly facing thee respective surfaces in the viewpoint conversion process P4. In the above-described viewpoint conversion process P4, however, for example, a laser radar may be used as the external sensor V1, and three-dimensional information of an object output from the laser radar may be used as the external environment information. In this case, the conversion unit 122a can convert information on a front surface and a side surface of the object included in the three-dimensional object information based on external environment information acquired from an oblique direction intersecting a longitudinal direction of the object into perpendicularly facing front surface information and perpendicularly facing side surface information obtained by perpendicularly facing the front surface and the side surface, respectively.

Further, the vehicles and the person have been described as examples of the objects detected by the external sensor in the above-described embodiments, but the objects detected by the external sensor may be, for example, stationary objects such as a fence, a wall, a building, a traffic light, a utility pole, a guardrail, and a median strip. Further, the split region including the windshield is identified based on the reflection intensity of the millimeter wave radar in the first embodiment described above, but the split region including the windshield may be identified based on an image of an imaging device.

Further, the functional blocks (software) implemented by executing the program that causes a part of the vehicle control device to be loaded in the memory have been described in the above-described embodiments, but a part or all of the functional block may be implemented by hardware such as an integrated circuit. Further, some of connection relationships illustrated in FIG. 1 may be omitted, and all the configurations may be connected to each other.

Further, in a case where three-dimensional object information detected by a vehicle control device of another vehicle is received by a vehicle control device of a host vehicle through vehicle-to-vehicle communication via communication units of the both, a target region, a split region, a damage degree, and the like may be set by the vehicle control device of the host vehicle. Further, the target region, the split region, the damage degree, and the like set by the vehicle control device of another vehicle may be used by the vehicle control device of the host vehicle.

REFERENCE SIGNS LIST 100 vehicle control device
121 three-dimensional object information generation unit
122b feature extraction unit
122 damage degree map generation unit
123 travel control unit
124 host vehicle information storage unit
G1 image information
G2 image information
OR target region
OV oncoming vehicle (object)
P pedestrian (object)
RG1 perpendicularly facing image information (perpendicularly facing front surface information)
RG2 perpendicularly facing image information (perpendicularly facing side surface information)
S space
SR split region
V host vehicle (vehicle)
V1 external sensor
V11 imaging device
V12 radar device (millimeter wave radar device)
V2 communication unit
VSR host vehicle split region

The invention claimed is:

1. A vehicle control device mounted on a vehicle, the vehicle control device comprising one or more processors configured to:
    detect an object around the vehicle based on external environment information output from an external sensor mounted on the vehicle to generate three-dimensional object information;
    generate information on a plurality of split regions, which are obtained by splitting a target region including the object in a longitudinal direction and a height direction based on the external environment information, and set a damage degree to each of the plurality of split regions depending on an estimated magnitude of damage at an estimated time of collision of the vehicle;
    record information on a plurality of host vehicle split regions, which are obtained by splitting a host vehicle region including the vehicle, and a host vehicle damage degree set to each of the plurality of host vehicle split regions depending on an estimated magnitude of damage at an estimated time of collision of the object; and
    control travel of the vehicle to minimize a collision damage degree corresponding to the damage degree and a product of the damage degree and the host vehicle damage degree.

2. The vehicle control device according to claim 1, the one or more processors further configured to:
    convert pieces of information on a front surface and a side surface of the object included in the three-dimensional object information based on the external environment information acquired by the external sensor from an oblique direction intersecting the longitudinal direction of the object into perpendicularly facing front surface information and perpendicularly facing side surface information obtained by perpendicularly facing the front surface and the side surface, respectively, extract a feature portion of the object from the perpendicularly facing side surface information, and split the target region into the plurality of split regions in the longitudinal direction based on the feature portion.

3. The vehicle control device according to claim 2, wherein the one or more processors recognize a region where the object does not exist from the perpendicularly facing side surface information and defines the region as a space, and sets the split region where the object exists as a part of the vehicle based on the space and the plurality of split regions.

4. The vehicle control device according to claim 2, wherein the external sensor includes an imaging device, the external environment information includes image information of the object captured by the imaging device, the pieces of the information of the front surface and the side surface are pieces of image information of the front surface and the side surface of the object captured from the oblique direction, and the perpendicularly facing front surface information and the perpendicularly facing side surface information are perpendicularly facing image information of the front surface and perpendicularly facing image information of the side surface, respectively.

5. The vehicle control device according to claim 1, wherein the one or more processors further configured to:

acquire information on the object transmitted from outside of the vehicle via a communication unit mounted on the vehicle; and detect the object around the vehicle based on the external environment information and the information on the object.

6. The vehicle control device according to claim 1, wherein the external sensor includes a millimeter wave radar device, and the one or more processors recognize a split region including a windshield based on a radar reflection intensity output from the millimeter wave radar device, and sets the damage degree corresponding to a cabin of the vehicle to the split region including the windshield among the plurality of split regions.

* * * * *